United States Patent
Coombe et al.

(10) Patent No.: US 12,241,757 B1
(45) Date of Patent: Mar. 4, 2025

(54) GENERATION OF WEIGHTED MAP DATA FOR AUTONOMOUS VEHICLE LOCALIZATION

(71) Applicant: Aurora Operations, Inc., Mountain View, CA (US)

(72) Inventors: Greg Coombe, Mountain View, CA (US); Yekeun Jeong, Sunnyvale, CA (US)

(73) Assignee: AURORA OPERATIONS, INC, Mountain View, CA (US)

( * ) Notice: Subject to any disclaimer, the term of this patent is extended or adjusted under 35 U.S.C. 154(b) by 157 days.

(21) Appl. No.: 17/850,340

(22) Filed: Jun. 27, 2022

Related U.S. Application Data

(63) Continuation of application No. 17/849,049, filed on Jun. 24, 2022.

(51) Int. Cl.
*G01C 21/00* (2006.01)
*B60W 60/00* (2020.01)

(52) U.S. Cl.
CPC ....... *G01C 21/3867* (2020.08); *B60W 60/001* (2020.02); *B60W 2556/40* (2020.02)

(58) Field of Classification Search
CPC . G01C 21/387; G01C 21/367; G01C 21/3804
See application file for complete search history.

(56) References Cited

U.S. PATENT DOCUMENTS

| | | | |
|---|---|---|---|
| 10,776,948 B1 | 9/2020 | Parisotto et al. | |
| 11,430,087 B2 | 8/2022 | Bosse | |
| 11,598,876 B2 | 3/2023 | Zeng | |
| 12,060,074 B2 | 8/2024 | Taki | |
| 2014/0358414 A1* | 12/2014 | Ibrahim | G01C 21/10 701/119 |
| 2019/0051056 A1 | 2/2019 | Chiu | |
| 2019/0138000 A1 | 5/2019 | Hammond et al. | |
| 2020/0004266 A1* | 1/2020 | Eoh | G05D 1/0276 |
| 2020/0264258 A1 | 8/2020 | Zhang | |
| 2021/0063200 A1* | 3/2021 | Kroepfl | C03C 17/3644 |

(Continued)

FOREIGN PATENT DOCUMENTS

| | | |
|---|---|---|
| CN | 103777220 | 5/2014 |
| FR | 2988201 | 9/2013 |

(Continued)

OTHER PUBLICATIONS

Toledo et al.; Improving Odometric Accuracy for an Autonomous Electric Cart, MDPI, Jan. 12, 2018, 15 pages.

(Continued)

*Primary Examiner* — Thomas Ingram
(74) *Attorney, Agent, or Firm* — Gray Ice Higdon

(57) ABSTRACT

Map data describing various geometric elements in a map used in autonomous vehicle localization is selectively weighted to vary the relative contributions of different geometric elements to an alignment operation. By doing so, the alignment operation may be biased to emphasize geometric elements associated with objects in an environment that are relatively more stable, e.g., roadways, walls, buildings, etc., over objects that are relatively less stable, e.g., vegetation, thereby in many instances improving alignment operation performance and/or availability.

18 Claims, 9 Drawing Sheets

(56) References Cited

U.S. PATENT DOCUMENTS

| | | | | |
|---|---|---|---|---|
| 2021/0381843 A1* | 12/2021 | Montemerlo | ........ | G05D 1/0285 |
| 2022/0076030 A1* | 3/2022 | Anguelov | ............. | G06F 18/251 |
| 2022/0198706 A1* | 6/2022 | Su | ...................... | G01C 21/3602 |
| 2022/0204019 A1* | 6/2022 | Lauterbach | ............ | G06T 15/205 |
| 2022/0326023 A1* | 10/2022 | Xu | .................... | B60W 60/0025 |
| 2022/0383745 A1 | 12/2022 | Heilbron | | |
| 2023/0035780 A1* | 2/2023 | Duenas Arana | ..... | G05D 1/0221 |
| 2023/0077909 A1* | 3/2023 | Arnicar | ............. | G01C 21/3819 |
| | | | | 701/23 |
| 2023/0121226 A1 | 4/2023 | Schroeter | | |
| 2023/0127185 A1* | 4/2023 | Jeong | ................. | G01C 21/3807 |
| | | | | 701/25 |
| 2023/0391358 A1* | 12/2023 | Donderici | ............ | G06V 20/584 |
| 2024/0094029 A1* | 3/2024 | Armstrong | ............ | B60W 40/02 |

FOREIGN PATENT DOCUMENTS

| | | |
|---|---|---|
| WO | 2017079219 | 5/2017 |
| WO | 2022051263 | 3/2022 |

OTHER PUBLICATIONS

Badue et al.; Self-Driving Cars: A Survey, Oct. 2, 2019, 34 pages.

Yi et al.; Metrics for the Evaluation of localisation Robustness, Apr. 18, 2019, 7 pages.

Meng et al; A Robust Vehicle Localization Approach Based on GNSS/IMU/DMI/LiDAR Sensor Fusion for Autonomous Vehicles, Sep. 18, 2017, 19 pages.

Thrun et al., "Probabilistic Robotics", Chapter 4.2, 492 pages.

Behley, J., & Stachniss, C. Efficient Surfel-Based SLAM Using 3D Laser Range Data in Urban Environments. Robotics: Science and Systems; (vol. 2018), 10 pages.

Demantke J., Mallet C., David N. and Vallet B., Dimensionality Based Scale Selection in 3D Lidar Point Cloud. The International Archives of the Photogrammetry, Remote Sensing and Spatial Information Sciences, XXXVIII-5/W12, 97-102, 2011, 6 pages.

United States Patent and Trademark Office, Office Action issued in U.S. Appl. No. 17/124,070 dated Jul. 21, 2022, 46 pages.

Shankar, Arpitha et al., "Implementation of ICP•Slam Algorithm on Fire Bird V for Mapping of an Indoor Environment." Atlantis Press. Atlantis Highlights in Computer Sciences, vol. 4, pp. 647-651. (Year: 2021).

United States Patent and Trademark Office, Office Action issued in U.S. Appl. No. 17/849,049 dated Apr. 4, 2024, 78 pages.

Hinton, Henry R., United States Patent and Trademark Office, Final Office Action issued in U.S. Appl. No. 17/849,049, 119 pages, dated Sep. 5, 2024.

\* cited by examiner

GENERATION OF WEIGHTED MAP DATA FOR AUTONOMOUS VEHICLE LOCALIZATION

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate map data exists). Finally, Level 5 autonomy represents a level of autonomy where a vehicle is capable of operating free of operator control under any circumstances where a human operator could also operate.

The fundamental challenges of any autonomy-related technology relate to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

One particular task that is often required in the control of an autonomous vehicle is localization, which generally involves determining precisely where an autonomous vehicle is located within its environment. In many instances, localization is used to determine a "pose" of the autonomous vehicle, which in many instances includes both a location and an orientation of the autonomous vehicle. From this information, the vehicle's position in relation to other objects in the environment, including roads, lanes, buildings, etc., may be determined and used to control the operation of the autonomous vehicle to follow a desired path.

While global localization systems such as GPS may be used in some instances to determine approximately where an autonomous vehicle is located, the accuracy and availability of such measurements is generally insufficient for autonomous vehicle control. Therefore, in many autonomous vehicle control systems, localization involves performing an alignment operation to compare what the autonomous vehicle currently perceives in its environment with a map that maintains a high resolution representation of the environment. In some autonomous vehicles, for example, a Light Detection and Ranging (LIDAR) sensor is used to generate a point cloud representing the ranges to different surfaces in the immediate vicinity of the autonomous vehicle, and an alignment operation is performed to compare the point cloud against the representation of the environment in the map to locate the precise location and orientation of the autonomous vehicle where the point cloud most closely matches the representation of the environment in the map.

SUMMARY

One challenge associated with localization, however, is that the environment is constantly changing, and maps may need to be updated frequently in order to account for changes in the environment. Furthermore, not all of the objects in the environment are completely invariant, so the surfaces presented by these objects when sensed by an autonomous vehicle may not be exactly the same as their representations in a map. As one example, grass along an interstate grows over time, and is periodically mowed, resulting in substantial height variations on the sides of the interstate over time. In some cases, these changes can decrease the accuracy of an alignment operation, and in some cases, these changes can be so significant that alignment operations fail, and require areas of the environment to be remapped. Therefore, a continuing need exists in the art for improvements to autonomous vehicle localization.

The herein-described embodiments address these and other problems associated with the art in part by selectively weighting map data describing various geometric elements in a map used in autonomous vehicle localization to vary the relative contributions of different geometric elements to an alignment operation. By doing so, the alignment operation may be biased to emphasize geometric elements associated with objects in an environment that are relatively more stable, e.g., roadways, walls, buildings, etc., over objects that are relatively less stable, e.g., vegetation, thereby in many instances improving alignment operation performance and/or availability.

Therefore, consistent with one aspect of the invention, a method of localizing an autonomous vehicle in an environment may include obtaining, from one or more sensors of the autonomous vehicle, a plurality of sensor returns from the environment, accessing stored map data describing the environment, where the map data includes a plurality of map data units that describe a plurality of geometric elements for a plurality of objects in the environment, accessing a weight associated with a respective map data unit of the plurality of map data units, where the weight is indicative of a relative stability of a respective geometric element that is described by the respective map data unit, and aligning the plurality of sensor returns with the plurality of map data units to determine a pose of the autonomous vehicle in the environment, including using the weight of the respective map data unit to weight a contribution of the respective map data unit when aligning the plurality of sensor returns with the plurality of map data units.

In some embodiments, aligning the plurality of sensor returns with the plurality of map data units includes executing an iterative closest point algorithm to determine a transformation that aligns the plurality of sensor returns with the plurality of map data units. Also, in some embodiments, performing the iterative closest point algorithm includes, for each of a plurality of iterations determining a plurality of associated point/geometric element pairs, each associated point/geometric element pair including a point from the plurality of sensor returns and a geometric element of the plurality of geometric elements described by a map data unit from the plurality of map data units, determining a respective distance for each of the plurality of associated point/geometric element pairs, scaling the respective distance for each of the plurality of associated point/geometric element pairs by the weight associated with the respective map data unit describing the respective geometric element to generate a respective scaled distance for each of the plurality of associated point/geometric element pairs, and determining an error metric using the scaled distances for the plurality of associated point/geometric element pairs.

Further, in some embodiments, accessing the weight associated with the respective map data unit includes accessing a weight value logically stored in the map data unit. In some embodiments, accessing the weight associated with the respective map data unit includes accessing a type value logically stored in the map data unit to determine a type associated with the respective map data unit and accessing a weight value associated with the determined type. In addition, in some embodiments, accessing the weight associated with the respective map data unit includes determining a parent object for the map data unit and accessing a weight value associated with the determined parent object.

In some embodiments, the weight associated with the respective map data unit is generated using a heuristic approach. In addition, in some embodiments, the weight associated with the respective map data unit is generated based at least in part upon an object type associated with the geometric element described by the respective map data unit. Moreover, in some embodiments, the weight associated with the respective map data unit is generated based at least in part upon an annotation associated with the environment. In some embodiments, the weight associated with the respective map data unit is generated based at least in part upon a vehicle pose associated with the environment.

Moreover, in some embodiments, the weight associated with the respective map data unit is generated based at least in part upon geometric analysis of the geometric element described by the respective map data unit and/or of surrounding geometry in the environment. In some embodiments, the geometric analysis determines a fuzziness of the geometric element described by the respective map data unit and/or of the surrounding geometry. In addition, in some embodiments, the geometric analysis determines a planarity of the geometric element described by the respective map data unit and/or of the surrounding geometry. In some embodiments, the weight associated with the respective map data unit is generated based at least in part upon geometric analysis of point cloud covariances over multiple resolutions. Moreover, in some embodiments, a size of the geometric element described by the respective map data unit is determined based upon geometric analysis of point clouds over multiple resolutions.

Also, in some embodiments, the weight associated with the respective map data unit is generated based at least in part upon an alignment statistic generated during a prior alignment operation. In some embodiments, the weight associated with the respective map data unit is generated based at least in part upon applying a Bayesian filter to an alignment statistic generated during a prior alignment operation. In addition, in some embodiments, the weight associated with the respective map data unit is generated using a machine learning model. Also, in some embodiments, the geometric element described by the respective map data unit is a surfel.

Consistent with another aspect of the invention, an autonomous vehicle may include a memory storing map data describing an environment, where the map data includes a plurality of map data units that describe a plurality of geometric elements for a plurality of objects in the environment, and where the memory further stores a weight associated with a respective map data unit of the plurality of map data units, and the weight is indicative of a relative stability of a respective geometric element that is described by the respective map data unit, and an autonomous vehicle control system coupled to the memory and configured to localize the autonomous vehicle in the environment by aligning a plurality of sensor returns collected from the environment by one or more sensors with the plurality of map data units stored in the memory to determine a pose of the autonomous vehicle in the environment, where the autonomous vehicle control system is further configured to use the weight of the respective map data unit stored in the memory to weight a contribution of the respective map data unit when aligning the plurality of sensor returns with the plurality of map data units.

Consistent with another aspect of the invention, a non-transitory computer readable storage medium may store computer instructions executable by one or more processors to perform a method of localizing an autonomous vehicle in an environment, which may include obtaining, from one or more sensors of the autonomous vehicle, a plurality of sensor returns from the environment, accessing stored map data describing the environment, where the map data includes a plurality of map data units that describe a plurality of geometric elements for a plurality of objects in the environment, accessing a weight associated with a respective map data unit of the plurality of map data units, where the weight is indicative of a relative stability of a respective geometric element that is described by the respective map data unit, and aligning the plurality of sensor returns with the plurality of map data units to determine a pose of the autonomous vehicle in the environment, including using the weight of the respective map data unit to weight a contribution of the respective map data unit when aligning the plurality of sensor returns with the plurality of map data units.

Consistent with another aspect of the invention, a method of weighting geometric elements used for localization of an autonomous vehicle may include accessing stored map data describing the environment, where the map data includes a plurality of map data units that describe a plurality of geometric elements for a plurality of objects in the environment, generating a weight associated with a respective map data unit of the plurality of map data units, where the weight is indicative of a relative stability of a respective geometric element that is described by the respective map data unit, and storing the determined weight for use by alignment operations that align sensor returns from one or more autonomous vehicles with the plurality of map data units.

Moreover, in some embodiments, generating the weight includes generating the weight using a heuristic approach. Further, in some embodiments, generating the weight includes generating the weight based at least in part upon an object type associated with the geometric element described by the respective map data unit. Also, in some embodiments, generating the weight includes generating the weight based at least in part upon an annotation associated with the environment. Further, in some embodiments, generating the weight includes generating the weight based at least in part upon a vehicle pose associated with the environment.

In some embodiments, generating the weight includes generating the weight based at least in part upon performing geometric analysis of the geometric element described by the respective map data unit and/or of surrounding geometry in the environment. Also, in some embodiments, the geometric analysis determines a fuzziness of the geometric element described by the respective map data unit and/or of the surrounding geometry. In some embodiments, the geometric analysis determines a planarity of the geometric element described by the respective map data unit and/or of the surrounding geometry. Further, in some embodiments, generating the weight includes generating the weight based at least in part upon performing geometric analysis of point cloud covariances over multiple resolutions. Some embodiments may also include determining a size of the geometric element described by the respective map data unit based upon geometric analysis of point clouds over multiple resolutions.

In some embodiments, generating the weight includes generating the weight based at least in part upon an alignment statistic generated during a prior alignment operation. Further, in some embodiments, generating the weight includes generating the weight based at least in part upon applying a Bayesian filter to an alignment statistic generated during a prior alignment operation.

Also, in some embodiments, generating the weight includes generating the weight using a machine learning model. In addition, in some embodiments, the machine learning model is configured to output weights, and generating the weight using the machine learning model includes training the machine learning model using a training set of point-geometric element correspondences. In some embodiments, the machine learning model is configured to output features, and generating the weight using the machine learning model includes training the machine learning model using a training set of logs. In addition, in some embodiments, the geometric element described by the respective map data unit is a surfel.

Consistent with another aspect of the invention, an apparatus may include a memory storing map data describing an environment, where the map data includes a plurality of map data units that describe a plurality of geometric elements for a plurality of objects in the environment, one or more processors coupled to the memory, and computer instructions executable by the one or more processors to generate a weight associated with a respective map data unit of the plurality of map data units, where the weight is indicative of a relative stability of a respective geometric element that is described by the respective map data unit, and store the determined weight in the memory for use by alignment operations that align sensor returns from one or more autonomous vehicles with the plurality of map data units.

Consistent with another aspect of the invention, a non-transitory computer readable storage medium may store computer instructions executable by one or more processors to perform a method of weighting geometric elements used for localization of an autonomous vehicle, which may include accessing stored map data describing the environment, where the map data includes a plurality of map data units that describe a plurality of geometric elements for a plurality of objects in the environment, generating a weight associated with a respective map data unit of the plurality of map data units, where the weight is indicative of a relative stability of a respective geometric element that is described by the respective map data unit, and storing the determined weight for use by alignment operations that align sensor returns from one or more autonomous vehicles with the plurality of map data units.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

The various implementations discussed hereinafter are generally directed to the use of weighted map data to improve autonomous vehicle localization. Prior to a discussion of these implementations, however, an example autonomous vehicle environment within which the various techniques disclosed herein may be implemented will be discussed.

Autonomous Vehicle Environment

Figure 1:
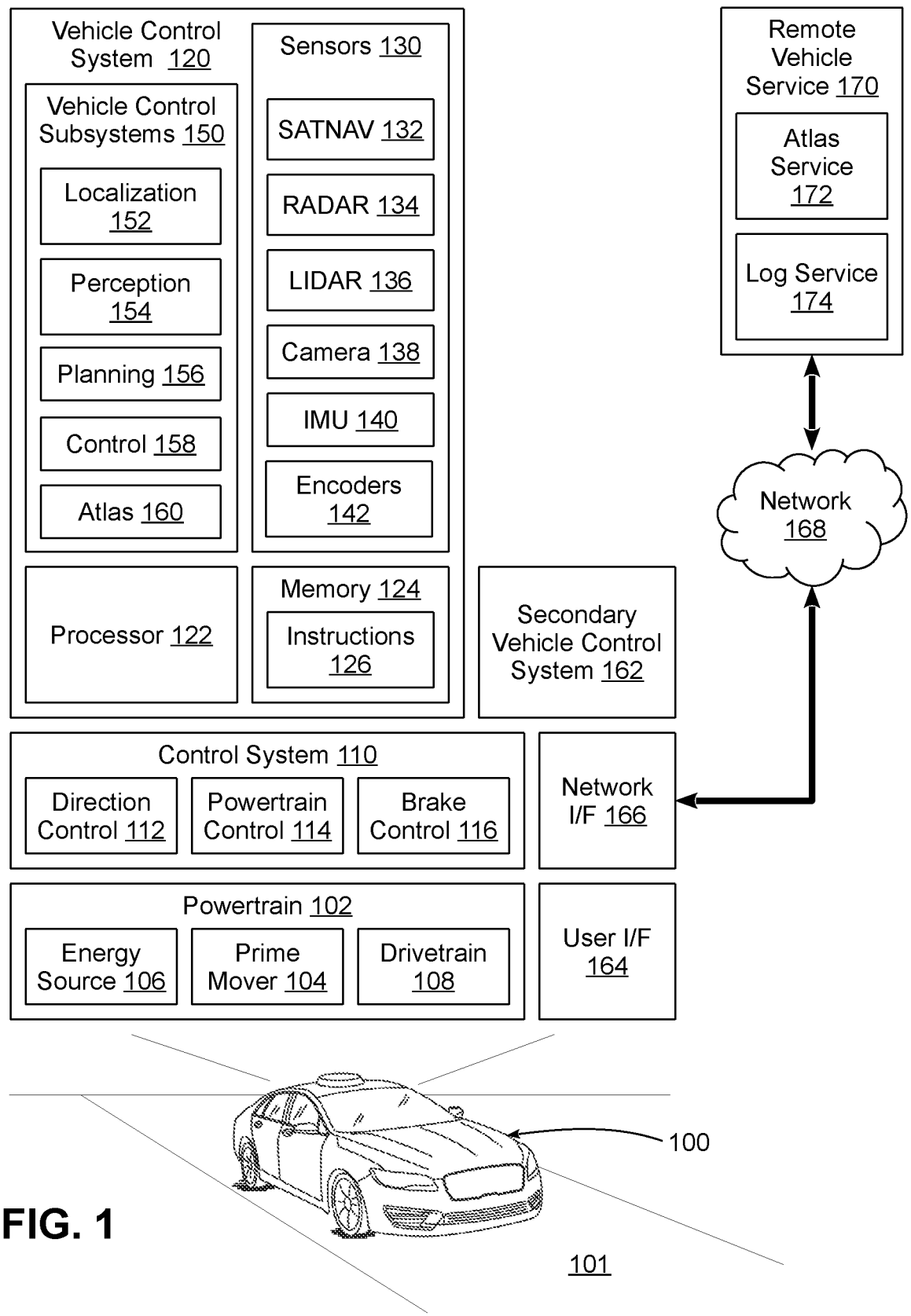
FIG. 1 illustrates an example hardware and software environment for an autonomous vehicle.

Turning to the Drawings, wherein like numbers denote like parts throughout the several views, FIG. 1 illustrates an autonomous vehicle 100 suitable for utilizing the various techniques described herein. Vehicle 100, for example, may include a powertrain 102 including a prime mover 104 powered by an energy source 106 and capable of providing power to a drivetrain 108, as well as a control system 110 including a direction control 112, a powertrain control 114, and brake control 116. Vehicle 100 may be implemented as any number of different types of vehicles, including vehicles capable of transporting one or both of people and cargo, and it will be appreciated that the aforementioned components 102-116 may vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors, an internal combustion engine, or a combination thereof (among others). The energy source 106 may include, for example, one or more of a fuel system (e.g., providing gasoline, diesel, hydrogen, etc.), a battery system, solar panels or other renewable energy source, and a fuel cell system. Drivetrain 108 may include one or more of wheels, tires, a transmission and any other mechanical drive components suitable for converting the output of prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

Direction control 112 may include one or more actuators, one or more sensors, or a combination thereof for controlling and receiving feedback from the direction or steering components to enable the vehicle 100 to follow a desired trajectory. Powertrain control 114 may be configured to control the output of powertrain 102, e.g., to control the output power of prime mover 104, to control a gear of a transmission in drivetrain 108, etc., thereby controlling one or more of a speed and direction of the vehicle 100. Brake control 116 may be configured to control one or more brakes that slow or stop vehicle 100, e.g., disk or drum brakes coupled to the wheels of the vehicle.

Other vehicle types will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, implementations disclosed herein not limited to the particular application of the herein-described techniques in an autonomous wheeled land vehicle.

In the illustrated implementation, full or semi-autonomous control over vehicle 100 is implemented in a vehicle control system 120, which may include one or more processors 122 and one or more memories 124, with each processor 122 configured to execute program code instructions 126 stored in a memory 124. The processor(s) 122 may include, for example, one or more graphics processing units (GPUs), one or more central processing units (CPUs), or a combination thereof.

Sensors 130 may include various sensors suitable for collecting information from a vehicle's surrounding environment for use in controlling the operation of the vehicle. For example, a satellite navigation (SATNAV) sensor 132, e.g., compatible with any of various satellite navigation systems such as GPS, GLONASS, Galileo, Compass, etc., may be used to determine the location of the vehicle on the Earth using satellite signals. Radio Detection And Ranging (RADAR) and Light Detection and Ranging (LIDAR) sensors 134, 136, as well as a digital camera 138 (which may include various types of image capture devices capable of capturing still and/or video imagery), may be used to sense stationary/static and moving/dynamic objects within the immediate vicinity of a vehicle. An inertial measurement unit (IMU) 140 may include multiple gyroscopes and accelerometers capable of detection linear and rotational motion of a vehicle in three directions, while one or more wheel encoders 142 may be used to monitor the rotation of one or more wheels of vehicle 100.

The outputs of sensors 130 may be provided to a set of vehicle control subsystems 150, including, for example, a localization subsystem 152, a perception subsystem 154, a planning subsystem 156, and a control subsystem 158. Localization subsystem 152 may be principally responsible for precisely determining the location and orientation (also sometimes referred to as "pose", which in some instances may also include one or more velocities and/or accelerations) of vehicle 100 within its surrounding environment, and generally within some frame of reference.

Perception subsystem 154 may be principally responsible for detecting, tracking and/or identifying elements within the environment surrounding vehicle 100. For example, perception subsystem 154 may, at each of a plurality of iterations, determine a pose, classification, and velocity for each of one or more objects in the environment surrounding vehicle 100. Further, for example, the perception subsystem 154 may track various objects over multiple iterations. For instance, the perception subsystem 154 may track an additional vehicle over multiple iterations as the additional vehicle moves relative to vehicle 100.

Planning subsystem 156 may be principally responsible for planning a trajectory for vehicle 100 over some timeframe given a desired destination as well as the static and moving objects within the environment. For example, planning subsystem 156 may plan a trajectory for vehicle 100 based at least in part on one or more of a pose, classification, and velocity for each of one or more objects in an environment of the vehicle 100 in the environment surrounding vehicle 100. In some implementations, planning subsystem 156 may plan the trajectory for the vehicle 100 by generating, and considering, candidate trajectories for each of one or more additional mobile objects in the environment. Planning subsystem 156 may determine a candidate trajectory for an object at an iteration based on a pose, classification, velocity, or a combination thereof for the iteration, and may track the object over multiple iterations.

Control subsystem 158 may be principally responsible for generating suitable control signals for controlling the various controls in control system 110 in order to implement the planned trajectory of the vehicle 100.

In addition, an atlas subsystem 160, which may also be referred to as a map subsystem, may be provided in some implementations to describe the elements within an environment and the relationships therebetween. In some implementations, the atlas subsystem may be implemented as a Relative Atlas Subsystem (RAS), which may represent at least some entities represented in the atlas based upon relative poses, although the invention is not limited to use solely with map data represented in this fashion. Atlas subsystem 160 may be accessed by each of the localization, perception and planning subsystems 152-156 to obtain various information about the environment for use in performing their respective functions.

It will be appreciated that the collection of components illustrated in FIG. 1 for vehicle control system 120 is merely exemplary in nature. Individual sensors may be omitted in some implementations. Additionally or alternatively, in some implementations multiple sensors of the types illustrated in FIG. 1 may be used for redundancy or to cover different regions around a vehicle, and other types of sensors may be used. Likewise, different types and combinations of control subsystems may be used in other implementations. Further, while subsystems 152-158 are illustrated as being separate from processors 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processors and memory. Subsystems in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize circuitry, processors, sensors or other components. Further, the various components in vehicle control system 120 may be networked in various manners.

In some implementations, vehicle 100 may also include a secondary vehicle control system 162, which may be used as a redundant or backup control system for vehicle 100. In some implementations, the secondary vehicle control system may be capable of fully operating autonomous vehicle 100 in the event of an adverse event in vehicle control system 120, while in other implementations, the secondary vehicle control system may only have limited functionality, e.g., to perform a controlled stop of vehicle 100 in response to an adverse event detected in primary vehicle control system 120. In still other implementations, the secondary vehicle control system may be omitted.

In addition, while powertrain 102, control system 110, and vehicle control system 120 are illustrated in FIG. 1 as being separate systems, in other implementations, some of all of these systems may be combined into a single system, e.g., with control system 110 and vehicle control system 120 combined into a single autonomous vehicle control system, or using other combinations. Further, in other implementations, some or all of the functionality illustrated as being within one system in FIG. 1 may be implemented in another system.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in vehicle 100, e.g., any cache memory in a processor, as well as any storage capacity used as a virtual memory, e.g., as stored on a mass storage device or on another computer or controller. One or more processors illustrated in FIG. 1, or entirely separate processors, may be used to implement additional functionality in vehicle 100 outside of the purposes of autonomous control, e.g., to control entertainment systems, to operate doors, lights, convenience features, etc. Processors may also be implemented in whole or in part within individual sensors in some implementations.

In addition, for additional storage, vehicle 100 may also include one or more mass storage devices, e.g., one or more of a removable disk drive, a hard disk drive, a direct access storage device (DASD), an optical drive (e.g., a CD drive, a DVD drive, etc.), a solid state storage drive (SSD), network attached storage, a storage area network, and a tape drive, among others. Furthermore, vehicle 100 may include a user interface 164 to enable vehicle 100 to receive a number of inputs from and generate outputs for a user or operator, e.g., one or more displays, touchscreens, voice interfaces, gesture interfaces, buttons and other tactile controls, etc. Otherwise, user input may be received via another computer or electronic device, e.g., via an app on a mobile device or via a web interface.

Moreover, vehicle 100 may include one or more network interfaces, e.g., network interface 166, suitable for communicating with one or more networks 168 (e.g., one or more of a LAN, a WAN, a wireless network, and the Internet, among others) to permit the communication of information with other computers and electronic devices, including, for example, a central service, such as a cloud service, from which vehicle 100 receives environmental and other data for use in autonomous control thereof. In the illustrated implementations, for example, vehicle 100 may be in communication with a cloud-based remote vehicle service 170 including, for example a map service 172 and a log collection service 174. Map service 172 may be used, for example, to maintain a global repository describing one or more geographical regions of the world, as well as to deploy portions of the global repository to one or more autonomous vehicles, to update the global repository based upon information received from one or more autonomous vehicles, and to otherwise manage the global repository. Log service 174 may be used, for example, to collect and/or analyze observations made by one or more autonomous vehicles during operation, enabling updates to be made to the global repository, as well as for other purposes.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network, e.g., in a distributed, cloud-based, or client-server computing environment, whereby the processing required to implement the functions of a computer program may be allocated to multiple computers or services over a network.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter will be described in the context of fully functioning computers and systems, it will be appreciated that the various implementations described herein are capable of being distributed as a program product in a variety of forms, and that implementations may be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Figure 2:
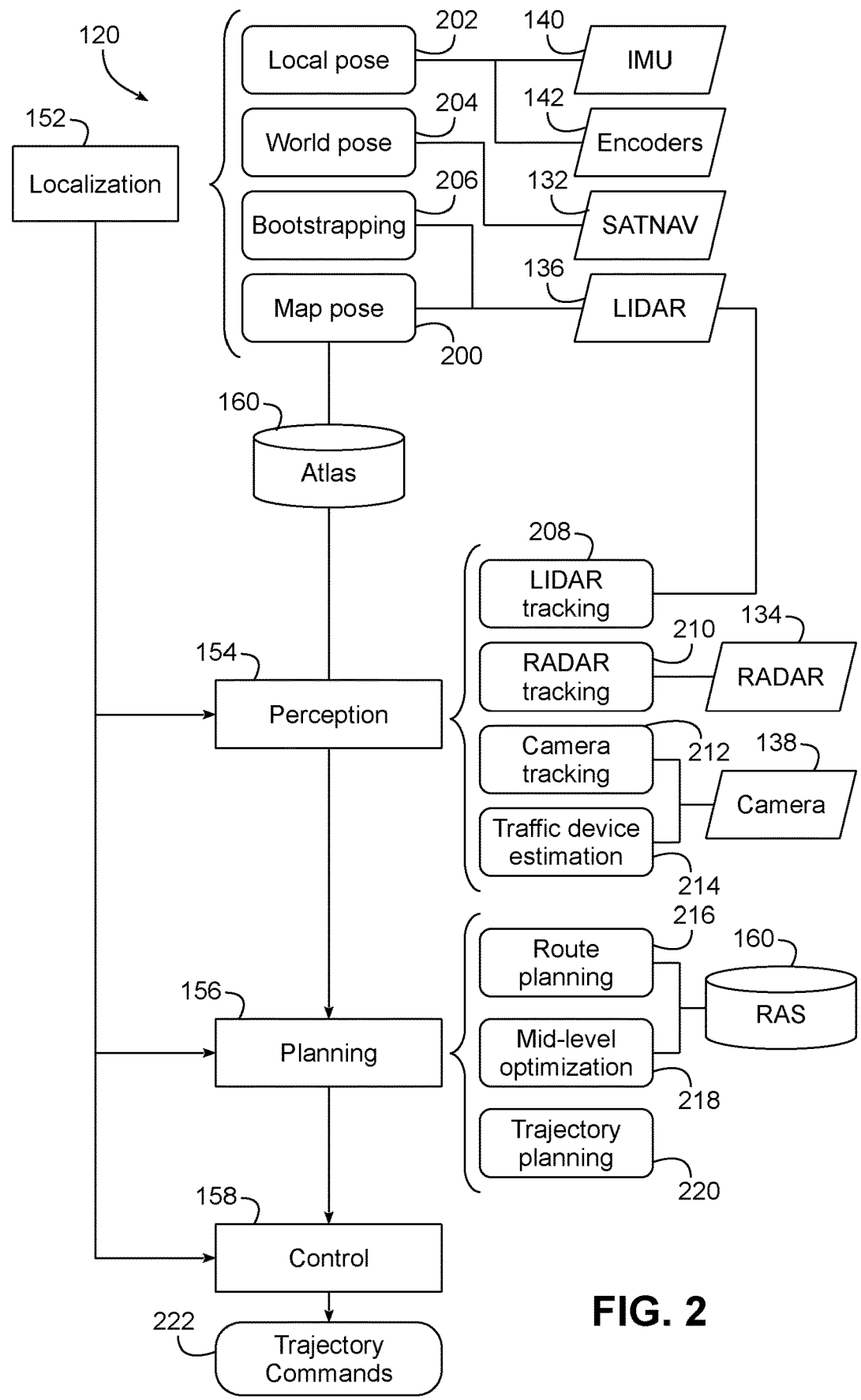
FIG. 2 is a block diagram illustrating an example implementation of the primary vehicle control system referenced in FIG. 1.

Now turning to FIG. 2, this figure illustrates vehicle control system 120 in greater detail. In this implementation, map or atlas subsystem 160 is used to provide map data, which may be used for various purposes in an autonomous vehicle, including for localization, planning, and perception, among other purposes. It will be appreciated that for different types of autonomous vehicles, e.g., on-road land vehicles, off-road land vehicles, air vehicles, on-water vehicles, underwater vehicles, space vehicles, etc., different types of map data may be appropriate based upon the particular requirements of such vehicles. The discussion hereinafter will focus on the use of an atlas subsystem with an on-road wheeled land vehicle such as a car, van, truck, bus, etc.; however, it will be appreciated that application of the herein-described techniques with other types of autonomous vehicles would be well within the abilities of those of ordinary skill having the benefit of the instant disclosure.

Within the context of an on-road land vehicle, map data may be used, for example, to lay out or place elements within a particular geographical area, which may include the entire world in some instances, or in other instances may be limited to a subset of the entire world. In some implementations, the elements may include elements that represent real world objects such as roadways, boundaries (e.g., barriers, lane dividers, medians, etc.), buildings, traffic devices (e.g., traffic signs, lights, etc.) and other static or fixed obstacles within an environment. Further, in some implementations the elements may include elements that are more logical or virtual in nature, e.g., elements that represent valid pathways a vehicle may take within an environment (referred to hereinafter as "gates"), "virtual" boundaries such as lane markings, or elements that represent logical collections or sets of other elements.

Map data in different implementations may also include data that characterizes or otherwise describes elements in an environment. For elements that represent real world objects, for example, data describing the geometry, dimensions, shape, etc. of such objects may be included. Further, data that describes the type, function, operation, purpose, etc., of elements in an environment may be included in some implementations. For example, data describing speed limits, lane restrictions, traffic device operations or logic, etc. may be included as map data in some implementations. In short, any data capable of describing some aspect of the environment within which an autonomous vehicle operates to enable the autonomous vehicle to operate within the environment may be incorporated as map data, so the invention is not limited to the specific types of map data described herein.

As noted above, map data may be used to lay out or place elements in a geographical area, and as such, further includes location data suitable for positioning elements within a map. A map, in this regard, may be considered to include any digital representation of a geographical area within which a vehicle may be located, and including information defining the positions and/or orientations of various elements in that geographical area, and in many instances along with additional information describing those elements. It will be appreciated that an autonomous vehicle control system may dynamically generate multiple types of maps in the course of controlling an autonomous vehicle.

FIG. 2 illustrates the responsibilities of the various subsystems 152-158 of FIG. 1 and their interaction with one another as well as with atlas subsystem 160. Localization subsystem 152 is generally responsible for providing localization data suitable for localizing a vehicle within its environment. Localization subsystem 152, for example, may determine a map pose 200 (generally a position, and in some instances orientation and/or speed) of the autonomous vehicle within its surrounding environment. As will become more apparent below, map pose 200 may be determined in part through the use of LIDAR 136, as well as using map data provided by atlas subsystem 160. Moreover, map pose 200 may be determined in part upon additional poses determined by localization subsystem 152. Through the use of IMU 140 and wheel encoders 142, for example, a local pose 202 of the vehicle may be determined, generally including the speed, acceleration/deceleration, and direction of travel of the vehicle over some limited time frame, but without any position within a global coordinate system. A world pose 204 may be determined, e.g., using SATNAV 132, to provide a general position of the vehicle within a global coordinate system. Localization subsystem 152 may also include a bootstrapping function 206 to determine an initial pose of the vehicle upon startup, e.g., based upon the vehicle's last known position and orientation, and in some instances independent of any local or world pose, thereby providing a starting point from which future poses may be determined.

Localization data is provided by localization subsystem 152 to each of perception, planning and control subsystems 154, 156, 158. Perception subsystem 154, for example, is principally responsible for perceiving dynamic objects such as pedestrians and other vehicles within the environment, and may utilize LIDAR tracking functionality 208, RADAR tracking functionality 210 and camera tracking functionality 212 to identify and track dynamic objects using LIDAR 136, RADAR 134 and camera 138, respectively. As noted above, objects that are generally static or stationary in the environment may be represented in atlas subsystem 160, and as such, perception subsystem 154 may access atlas subsystem 160 in order to determine whether sensed objects are static or dynamic. Further, perception subsystem 154 may also include traffic device estimation functionality 214, which may process images captured by camera 138 to determine the current states of traffic devices represented in atlas subsystem 160 (e.g., to determine whether a traffic light is green, amber or red).

Planning subsystem 156 is principally responsible for planning out a trajectory of the vehicle over some time frame (e.g., several seconds), and may receive input from both localization subsystem 152 and perception subsystem 154. Route planning functionality 216 may be used to plan a high level route for the vehicle based upon the static and dynamic objects in the immediate environment and the desired destination, while mid-level optimization functionality 218 may be used to make decisions based on traffic controls and likely motion of other actors in the scene, and both may utilize map data from atlas subsystem 160 to perform their functions. Trajectory planning functionality 220 may generate a trajectory for the vehicle over some time frame (e.g., several seconds), which is then passed on to control subsystem 158 to convert the desired trajectory into trajectory commands 222 suitable for controlling the various vehicle controls 112-116 in control system 110, with localization data also provided to control subsystem 158 to enable the control subsystem to issue appropriate commands to implement the desired trajectory as the location of the vehicle changes over the time frame.

Those skilled in the art will recognize that the exemplary environment illustrated in FIGS. 1-2 is not intended to limit the present invention. Indeed, those skilled in the art will recognize that other alternative hardware and/or software environments may be used without departing from the scope of the invention.

Localization Using Weighted Map Data

As noted above, a number of factors, including changes in an environment over time, can present challenges to localizing autonomous vehicles in an environment, particularly when localization is based upon alignment of sensor data with a map of the environment.

In particular, Iterative Closest Point (ICP) and similar alignment algorithms used for localization are generally based upon aligning a three-dimensional representation of an environment as sensed by one or more sensors with another three-dimensional representation of the environment as stored in a map. The alignment algorithm generally attempts to apply a transformation (e.g., a translation and/or rotation) to one of the representations to effectively minimize an error metric (e.g., a sum of squares between matched elements from the representations) representing how closely the two representations match one another when the transformation is applied. An ICP algorithm iteratively revises a transformation using various types of adjustments until a "best fit" is achieved, thereby allowing the pose of the autonomous vehicle within the map to be determined from the final transformation.

It will be appreciated, however, that what the sensors of an autonomous vehicle sense at any given time will rarely be a perfect match with what is stored in the map of the environment. Other vehicles, pedestrians, and other dynamic objects may be in the field of view of an autonomous vehicle's sensors. Moreover, even for objects that are presumed to be static, stationary or invariant, the precise locations and/or geographical extents may not be perfectly captured in a map, or may be based on real world objects lacking hard, defined surfaces, as is the case with vegetation such as trees, shrubbery, crops and ground covers such as grass. Further complicating the alignment is the fact that some presumably static objects, such as vegetation, can grow over time and/or be trimmed, mowed, harvested or cut at different points in time. Thus, alignment algorithms often converge to a transformation that has some degree of error.

One specific issue that has arisen with localization is the impact of large areas of vegetation on the sides of roadways, as the vegetation grows slowly over time but also mostly at the same rate, which may present as a relatively large "surface" that creeps upwardly over time, but that also may drop rapidly if mowed, harvested, cut, etc. If an alignment algorithm is based upon a map that assumes that the sides of the roadways in a certain area are at a certain elevation (e.g., within a few inches of the hard ground), and the sensor(s) on an autonomous vehicle senses vegetation that has grown several inches or more, the contributions of the sides of the roadway to the alignment algorithm may bias the alignment algorithm towards a transformation that locates the autonomous vehicle too low in order to match the sensor data with the surfaces defined in the map, and in some instances, may locate the autonomous vehicle below the surface of the roadway. Further, in some instances, too many outliers may be identified in an alignment algorithm, and cause the algorithm to fail and not return a result.

One manner of addressing this type of problem is to re-map areas where such effects are present. Remapping areas, however, is expensive and time consuming, and wasteful of resources, both from an organizational standpoint and a computational standpoint.

Implementations consistent with the invention, however, may use map data weighting to effectively vary the contributions of different geometric elements represented in a map to an alignment operation such that the alignment operation is successful more often. In some instances, map data weighting may be used to bias an alignment operation towards aligning sensor data with more stable geometric elements in a map than by less stable geometric elements. Stability, in this regard, may refer in some instances to the relative invariance of a geometric element, i.e., a greater stability implies a reduced likelihood that the location and/or geometric extents of a geometric element will change over time. Stability may also refer in some instances to the relative accuracy of the location and/or geometric extents of a geometric element, i.e., a geometric element representing a portion of a hard planar or curvilinear surface will generally be more stable than a geometric element representing a portion of the textured canopy of a tree that is formed of irregular and fluttering leaves. Stability may also refer more broadly in some instances to a measure of the relative likelihood that a geometric element is useful as a landmark in an alignment algorithm, or alternatively, the relative likelihood that a geometric element, once added to a map at a specific location, will be representative of a physical object sensed at that specific location when an alignment operation is later performed. In some instances, for example, the distance and/or orientation of a geometric element relative to a road surface may be an indicator of the stability of that geometric element.

Thus, for example, in some implementations consistent with the invention, map data representing the relatively unstable vegetation on the sides of a roadway may be downweighted as compared to the map data associated with other, more stable objects in the environment such as the buildings, walls, overpasses, posts, signs, and even the roadway itself. By doing so, the accuracy of an alignment operation may be improved, and in some instances, the likelihood of an alignment operation failure may also be reduced.

Specifically, in implementations consistent with the invention, an alignment operation may be performed using sensor returns from one or more sensors of an autonomous vehicle in an environment and stored map data that describes the environment and that includes map data units that describe respective geometric elements of various objects in the environment, e.g., static objects and/or objects that are presumed to be static in nature. At least a subset of the map data units may be associated with stored weights that are indicative of the relative stabilities of those geometric elements, such that when the sensor returns are aligned with the geometric elements described by those map data units to determine a pose of the autonomous vehicle in the environment, the relative contributions of the geometric elements to the pose determination will be varied based upon the respective stored weights of the map data units describing those geometric elements.

For the purposes of this disclosure, an environment may be considered to be a geographical area within which an autonomous vehicle may be located, and it will be appreciated that such an environment may include various types of physical objects therein, including various natural or man-made objects constituting the landscape of the environment, e.g., the ground, waterways, ponds, lakes, hills, walls, ditches, vegetation, etc., as well as other man-made structures such as roads, parking lots, buildings, sidewalks, signs, posts, overpasses, underpasses, etc. The aforementioned types of objects may generally be considered to be static objects from the perspective of autonomous vehicle localization as they generally can be expected to be present in the same location in the environment and with generally the same geometric extents over a reasonable amount of time (disregarding the fact that some of these objects may not be completely invariant over time, e.g., flags may move with the wind, grass may grow over time, trees may lose their leaves, etc.), and as they may be capable of effectively being used as landmarks for the purpose of determining precisely where in the environment an autonomous vehicle is currently positioned. Additional objects in an environment may include dynamic objects such as other vehicles, pedestrians, etc.; however, these objects are generally not expected to be present in the same location in the environment over time.

In the implementations discussed hereinafter, autonomous vehicle localization is based in part on sensing objects in the immediate vicinity of an autonomous vehicle using one or more sensors on the autonomous vehicle and then attempting to fit the sensed objects into a map that has previously been created for the environment and that represents at least a subset of the objects that are present in the environment, an operation that is referred to herein as an alignment operation. By fitting the sensed objects into the map, and based upon knowing the position and orientation of the autonomous vehicle in relation to those sensed objects, a "pose" of the autonomous vehicle, generally the location and orientation (direction) of the autonomous vehicle within the environment, may be determined.

A map, for the purposes of this disclosure, may be considered to include at least some map data representing the various objects, e.g., static and/or presumably static objects, in an environment, and generally stored in a datastore within and/or external from the autonomous vehicle. As noted above, maps may be used for a variety of purposes in an autonomous vehicle, and may include representations of physical objects as well as virtual objects, as well as metadata characterizing such objects. A map utilized for localization may include map data utilized for other purposes in some implementations, or in some instances, multiple maps, serving different purposes, may be used, whereby a map utilized for localization may include only localization-related map data.

The map data related to localization may be arranged and formatted in various manners in different implementations, but more generally may be considered to be organized into map data units that individually describe various geometric elements that represent the objects in the environment. Geometric elements, in turn, may include different types of geometric structures that are capable of representing the locations and/or geometric extents of objects in an environment, including surfaces, points, volumes, edges, lines, shapes, etc.

In the implementations discussed hereinafter, for example, map data units may be used to describe surface-type geometric elements referred to herein as surface elements, or surfels, that in turn represent surfaces for various objects in the environment. In other implementations, however, other manners of representing objects in a digital map of an environment may be used, e.g., polygon meshes and primitives, point clouds, height fields, or other point-based, surface-based, or volume-based representations, so the invention is not limited to map data units that describe surfels, or even to the use of surface-type geometric elements to represent the objects in an environment.

In addition, in some implementations, map data units may further be organized into tiles, which individually represent specific regions or portions of a geographical area. In some instances, a tile may define a common frame of reference or a coordinate system for a particular area or volume, such that geometric elements attached to a tile may be positioned and/or oriented within the common frame of reference for the tile. In some implementations, for example, a tile may have a square surface of approximately 200 square meters in size, although larger or smaller tile sizes, as well as other shapes, may be used in other implementations.

Surfels may be implemented in a number of different manners in different implementations. In some implementations, for example, an individual surfel may be implemented as a circular and planar disc defined by a centroid, a radius, and a normal vector. In other implementations, however, other shapes, sizes, contours and manners of describing a surface or other geometric element may be used. For example, a point or other geometric representation lacking a normal may be used in some instances, while in other instances, a modal representation from eigenvalue analysis may be used, e.g., a representation where each geometric element is categorized into linear, planar or volumetric.

Sensing for the purposes of localization in the implementations discussed hereinafter may be considered to utilize one or more sensors disposed on the autonomous vehicle and capable of sensing objects within the environment in the vicinity of the autonomous vehicle. The sensors may generate outputs, referred to as sensor returns, that may include one or more data values, which may be raw data output by a sensor or data that has been processed by the sensor in some fashion, and which may describe some aspect of the environment surrounding the autonomous vehicle. In the illustrated implementations, for example, one or more Light Detection and Ranging (LIDAR) sensors disposed on an autonomous vehicle may be used to generate a plurality of sensor returns that may be used to construct a point cloud that represents the surfaces of various objects detected in the vicinity of the autonomous vehicle. It will be appreciated, however, that other types of sensors may be used to generate sensor returns capable of being used in connection with localization, including, for example, RADAR sensors, cameras, and/or image sensors, and that various types of processing may be used on such sensor returns to construct a sensed representation of the environment in the vicinity of an autonomous vehicle.

Figure 3:
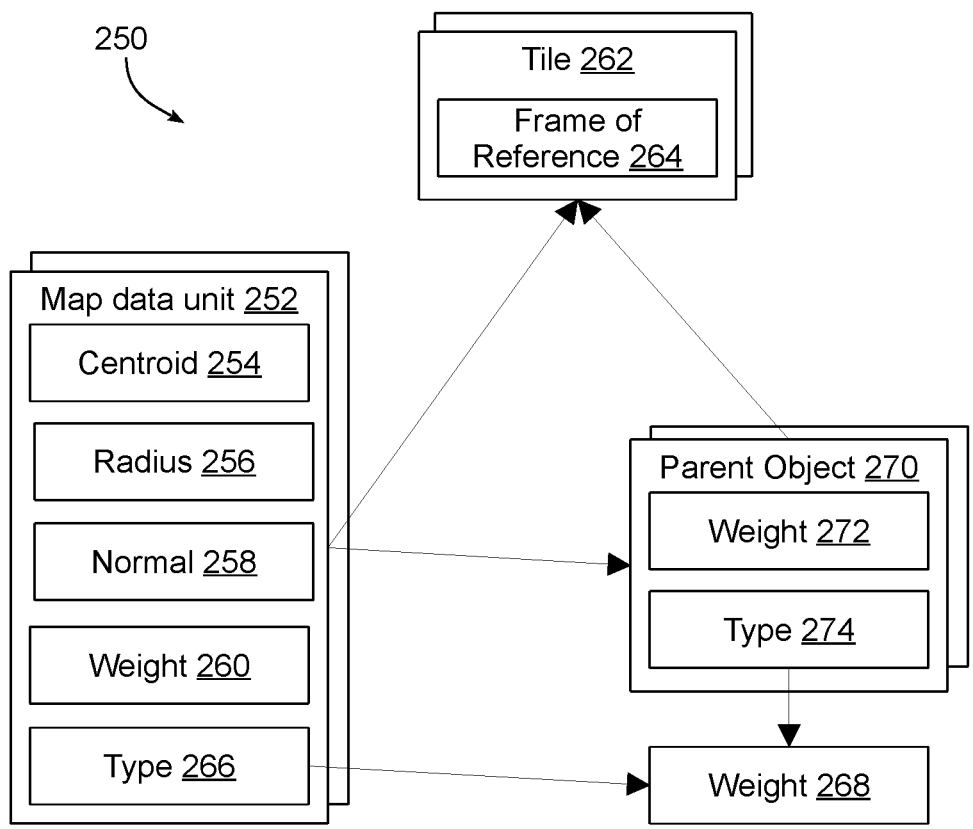
FIG. 3 is a block diagram illustrating an example map that may be used by the localization subsystem referenced in FIGS. 1 and 2.

Weights may be applied to map data units, and thus to the geometric elements represented thereby, in different manners in different implementations. FIG. 3, for example, illustrates an example map 250 including a plurality of map data units 252. Each map data unit 252 may describe a geometric element for an object in the environment, e.g., a surfel representing a portion of a surface of the object, and thus may store sufficient data for describing the geometric element. As an example, in order to describe a surfel that is configured as a planar circular disc, each map data unit 252 may include a centroid 254, a radius 256, and a normal vector 258. In addition, in some implementations, each map data unit 252 also includes a weight value 260 logically stored therein that indicates the relative stability of the geometric element described by the map data unit. While various formats may be used, in one implementation a weight may be a number between 0 and 1, and which increases with stability.

Map data units 252 may also be logically organized in map 250 for ease of access. For example, map 250 may include a plurality of tiles 262 that represent different geographical regions or areas, and each map data unit 252 may be assigned to a tile representing the area within which the surfel or other geometric element described by the map data unit is located. In addition, each tile 262 may define a frame of reference 264 in some implementations, such that, for example, the centroid 254 of the surfel described by each map data unit 252 is specified within the frame of reference of the tile, rather than a global frame of reference. Tiles 262 may be used, for example, to logically organize the map data units for a given area such that whenever an autonomous vehicle is located within an area corresponding to a particular tile 262, the tile may be used to access the map data units corresponding to that area.

While each map data unit 252 is illustrated with an individual weight value 260, it may also be desirable in some implementations to, in addition to or in lieu of associating individual weights with each map data unit and thus each surfel or other geometric element described thereby, assign common weights to multiple map data units, e.g., based upon the objects or types of objects with which such map data units are associated. For example, it may be desirable in some implementations to logically store a type value 266 in at least a subset of map data units 252, and assign a weight value 268 that is common to all map data units 262 sharing the same type. Thus, for example, if it is desirable to downweight all surfels or other geometric elements in an environment identified as vegetation, rather than assigning individual low weights to all map data units describing surfels representing vegetation, the map data units describing surfels or other geometric elements associated with vegetation may be assigned a predetermined type, and a common weight may be assigned to that type. Similarly, for map data units describing surfels or other geometric elements representing a roadway surface, the map data units may be assigned a different type, with a higher weight assigned to that different type.

As another alternative, it may also be desirable to group map data units 252 logically based upon the specific object or group of objects with which their described surfels or other geometric elements are associated, and assign a common weight at the level of the object or object group. FIG. 3, for example, illustrates a set of parent objects 270 representing various objects in an environment, e.g., roads, lanes, walls, buildings, etc., and at least a subset of the map data units may be assigned to one of objects 270. Each object 270 moreover may be assigned a common weight value 272, or alternatively, objects may also be classified by a type 274, which may then be assigned a weight value 268 common to all objects of that type. Thus, for example, the map data units assigned to a specific building may be assigned a common weight for that building, or alternatively all of the map data units assigned to all objects having a "building" type may be assigned a common weight.

It will be appreciated that in different implementations, weights may be integrated with the map data units, or may be stored separately altogether. Other manners of assigning weights to different map data units, and thus different surfels or other geometric elements, may be used in other implementations, and will be appreciated by those of ordinary skill having the benefit of the instant disclosure.

Figure 4:
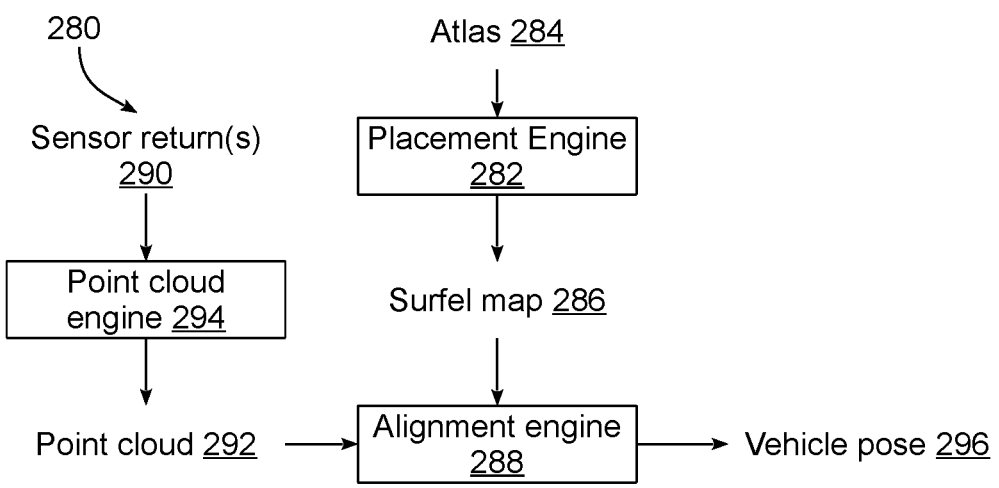
FIG. 4 is a block diagram illustrating an example implementation of a portion of the localization subsystem of FIGS. 1 and 2.

Now turning to FIG. 4, an example implementation of a portion of a localization subsystem 280 capable of utilizing weighted map data is illustrated. In the discussion hereinafter, reference will be made to surfels and weights applied to surfels, although as noted above, other geometric elements may be used to represent objects in an environment, so the references to operations performed with surfels should be considered to include analogous operations performed using other types of geometric elements. Moreover, as noted above, the surfels or other geometric elements used to represent the objects in an environment, and the weights applied thereto, are generally represented in an autonomous vehicle environment using map data units or in other suitable manners. As such, it will be appreciated that operations described hereinafter such as generating surfels, assigning weights thereto, performing alignments with surfels, etc. will generally be performed by generating, accessing and/or updating map data units that describe such surfels and weights, despite the fact that the underlying technical details of such map data unit manipulations are not specifically discussed.

Localization subsystem 280 may include a placement engine 282 that is configured to access an atlas subsystem 284 to obtain data from the atlas subsystem that is suitable for building a map of the locations and geometric extents of objects within the environment within which an autonomous vehicle is disposed, e.g., within one or more tiles. In this implementation, placement engine 282 may effectively build a three dimensional model of the environment from data stored in atlas subsystem 284, which may include both data describing the surfels in the environment and the weights to be applied to such surfels (e.g., using map data units as described above). In some implementations, placement engine 282 may dynamically build and place surfels and other entities into surfel map 286 from data stored in atlas subsystem 284 (e.g., by generating map data units), while in other implementations, surfel maps may be stored directly in atlas subsystem 284, whereby placement engine 282 may only retrieve a relevant, prebuilt surfel map (e.g., by retrieving stored map data units).

Surfel map 286 is used by an alignment engine 288 to process sensor returns 290 (e.g., sensor returns from one or more LIDAR sensors), which are processed into point clouds 292 by a point cloud engine 294, to align with surfel map 286 to determine a vehicle pose 292. In some implementations, the vehicle pose 292 may include a location and direction or heading. The vehicle pose in some implementations may be in a global frame of reference, while in other implementations, the vehicle pose may be a relative pose, e.g., in the frame of reference of a current tile within which the autonomous vehicle is located.

Figure 5:
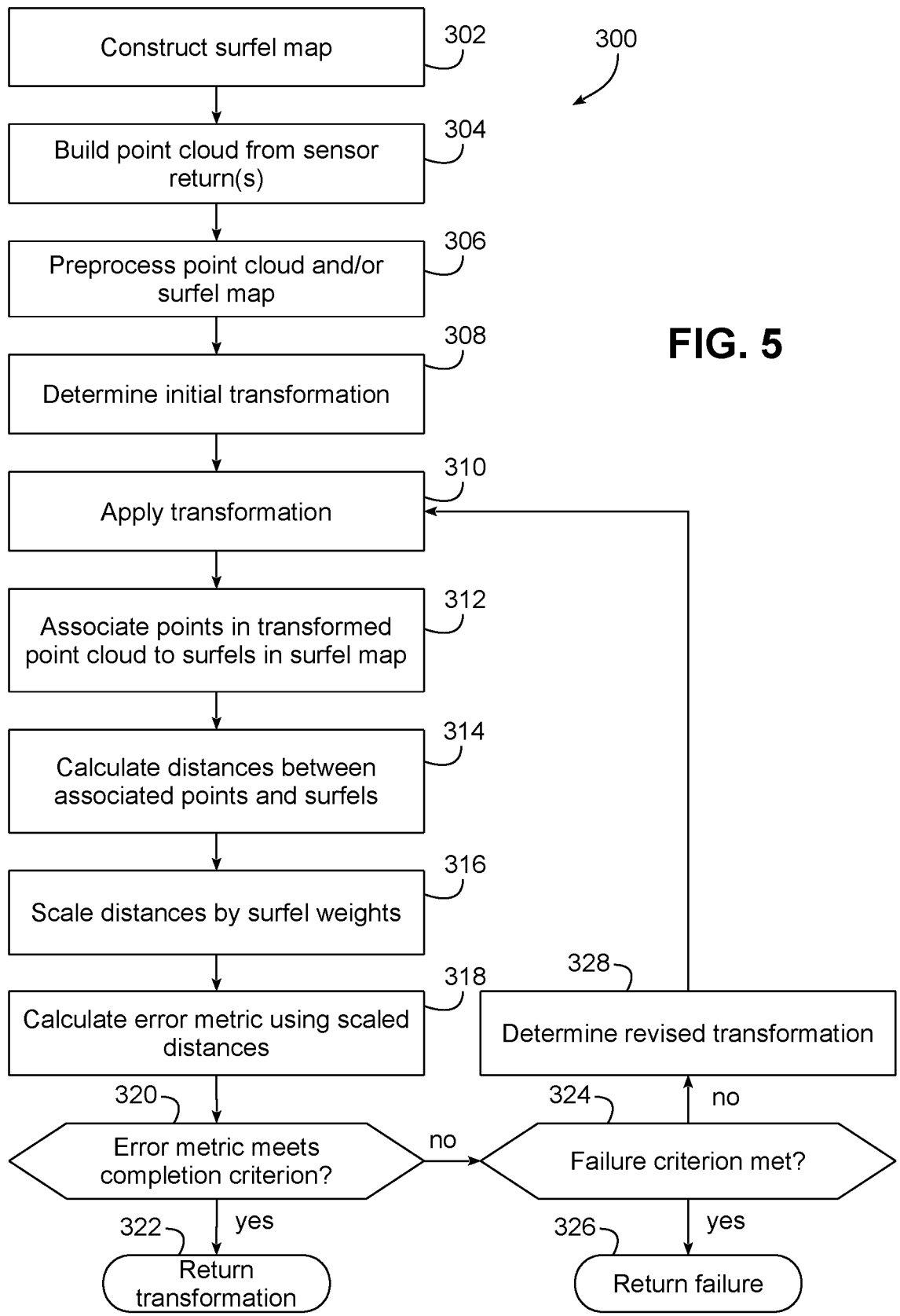
FIG. 5 is a flowchart illustrating an example sequence of operations for performing an alignment operation using weighted map data in the localization system of FIG. 3.

FIG. 5 illustrates an example sequence of operations 300 that may be performed by localization subsystem 280 to determine a vehicle pose. In block 302, a surfel map may optionally be constructed (e.g., by placement engine 282 of FIG. 4) from data in atlas subsystem 284, and in block 304, a point cloud may be built (e.g., by point cloud engine 294 of FIG. 4) from the sensor returns. Preprocessing of the point cloud and/or the surfel map may then be performed in block 306. In some implementations, preprocessing may include eliminating outliers from the point cloud and/or eliminating points in the point cloud and/or surfels from the surfel map determined as representing non-planar surfaces (e.g., by measuring "fuzziness" based upon the ratio of the smallest and largest eigenvectors in a point cloud neighborhood). Preprocessing may also in some implementations mask areas of known unstable geometry in the point cloud and/or surfel map as alignment exemptions such that they are ignored for the purposes of alignment.

Next, in block 308, an alignment operation, e.g., implementing an ICP alignment algorithm, is initiated (e.g., by alignment engine 288 of FIG. 4). In an ICP-based alignment operation, an iterative process is generally performed whereby for two three dimensional representations of an environment, one of the representations is transformed into the frame of reference of the other representation, and various entities (e.g., points, surfaces, objects, etc.) in the two representations are associated with one another, distances are calculated between the associated entities, and an error metric is calculated from those distances to determine the relative degree in which the two representations are aligned using the chosen transformation. If the error metric meets a completion criterion, the last transformation used is returned as the result of the alignment operation. Otherwise, a new transformation is chosen and processed in a similar manner, with the expectation that the operation will eventually converge to a "best fit" transformation. In some instances, additional, dynamic weighting may also be used in the ICP-based alignment algorithm to smooth out cost functions.

Thus, in block 308, an initial transformation (e.g., a translation and a rotation) is determined as a starting point for the alignment operation, e.g., based upon a prior alignment result, based upon a local or world pose as determined by other sensors, etc. The transformation is then applied in block 310, e.g., by transforming the point cloud to roughly align the point cloud within the frame of reference of the surfel map. Next, in block 312, points in the transformed point cloud are associated with surfels in the surfel map to generate associated point/surfel pairs (or more generally, associated point/geometric element pairs), and in block 314, distances between the associated points and surfels are calculated.

Next, in block 316, the distances calculated in block 314 are scaled by the weights assigned to the respective surfels, and then in block 318, the scaled distances are used to calculate an error metric that represents the degree in which the point cloud is aligned with the surfel map. In some implementations, for example, a sum of squares of the scaled distances may be used, although other error metrics may be used in other implementations.

By scaling the distances by the surfel weights, the contributions to the error metric of the distances determined in block 314 for the surfels having higher weights will increase, thereby effectively emphasizing the higher weighted surfels in the alignment operation. Further, the contributions to the error metric of the distances determined in block 314 for the surfels having lower weights will decrease, thereby effectively deemphasizing the lower weighted surfels in the alignment operation. It should be noted, however, that while scaling the distances by the surfel weights is used in the illustrated implementation, other manners of mathematically applying the surfel weights to influence the error metric, and thus the cost function of the ICP algorithm, may be used in the alternative, as will be appreciated by those of ordinary skill having the benefit of the instant disclosure.

Once the error metric is calculated, block 320 then determines if the error metric meets a completion criterion, e.g., a total error below a predetermined amount. If the completion criterion is met, the current transformation is returned as the result in block 322, and the alignment operation is complete.

However, assuming that the error metric does not yet meet the completion criterion after the first iteration, control then passes to block 324 to determine if a failure criterion has been met. For example, in order to prevent the alignment operation from hanging when no suitably accurate transformation has been found, it may be desirable to set a limit on the number of iterations that may be attempted before the alignment operation is determined to be unsuccessful. Thus, if the failure criterion has been met, control passes to block 326 to return a failure result, and the alignment operation is complete.

If, however, the failure criterion has not been met, another iteration is initiated, whereby control passes to block 328 to determine a revised transformation, and then control returns to blocks 310-318 to apply the revised transformation, associate point and surfels, calculate and scale distances, and calculate a revised error metric for the revised transformation. The manner of determining a revised transformation may vary in different implementations, using various optimization strategies that will be apparent to those of ordinary skill having the benefit of the instant disclosure.

Thus, the alignment operation will generally proceed through multiple iterations to arrive at a transformation that minimizes the error metric, such that a vehicle pose may be calculated therefrom.

As noted above, the manner in which weights may be determined for surfels and other geometric elements may vary in different implementations, and a number of example implementations for determining weights are described in greater detail below. It will be appreciated, however, that other manners of determining or assigning weights may be used in other implementations, so the invention is not limited to the specific implementations discussed hereinafter.

Heuristic Weighting

One manner of assigning weights to surfels and other geometric elements may be based at least in part upon various heuristic approaches. Heuristic approaches may include, for example, weighting based upon the types of objects determined to be likely represented by particular surfels, e.g., based upon the use of annotations defined in map data and/or geometric analysis of map data.

In particular, as noted above, objects such as buildings, walls, overpasses, posts, signs, and even the roadway itself may generally be considered to be more stable, and thus more likely to be usable as landmarks for the purposes of alignment. Thus, by attempting to predict the types of objects that certain surfels represent, weights may be assigned to those surfels to upweight surfels associated with more stable objects and/or downweight surfels associated with less stable objects.

As one example, annotations applied to map data describing particular objects in an environment may be used in weighting surfels in some implementations. An annotation is generally a type or classification assigned to a physical or logical object in a map. Annotations may be generated, for example, based upon analysis of data collected when driving through a physical environment, either by one or more autonomous vehicles or by non-autonomous vehicles incorporating suitable sensors. The analysis may be performed manually in some implementations, e.g., by an expert viewing the collected data, or may be performed through machine learning or other data analysis techniques. Various types of objects may be annotated, including, for example, a roadway, a boundary, a lane, a wall, a building, a post, a sign, a parked vehicle, vegetation such as a field, a bush or a tree, etc.

As another example, the geometry of a surfel or other geometric element represented in map data may be used to infer a type of object with which a surfel is associated, from which a stability of the surfel, and a weight to apply thereto, may also be inferred. Objects including planar surfaces are generally more stable that objects that include "fuzzier" or more contoured or undulating surfaces, while objects that are primarily vertical, which may be indicative of buildings, walls, posts, signs, etc., are generally more stable than non-vertical objects, so geometric analysis of surfels or other geometric elements represented in map data, or of other collected data associated with a particular area of an environment (e.g., the surrounding geometry), may be usable in some implementations for the purposes of weighting surfels. It will be appreciated therefor that geometric analysis may be performed, for the purposes of weighting surfels, on the surfels themselves, on the surrounding geometry in the environment (e.g., as determined from map data, sensor data, log data, etc.), or on both.

Figure 6:
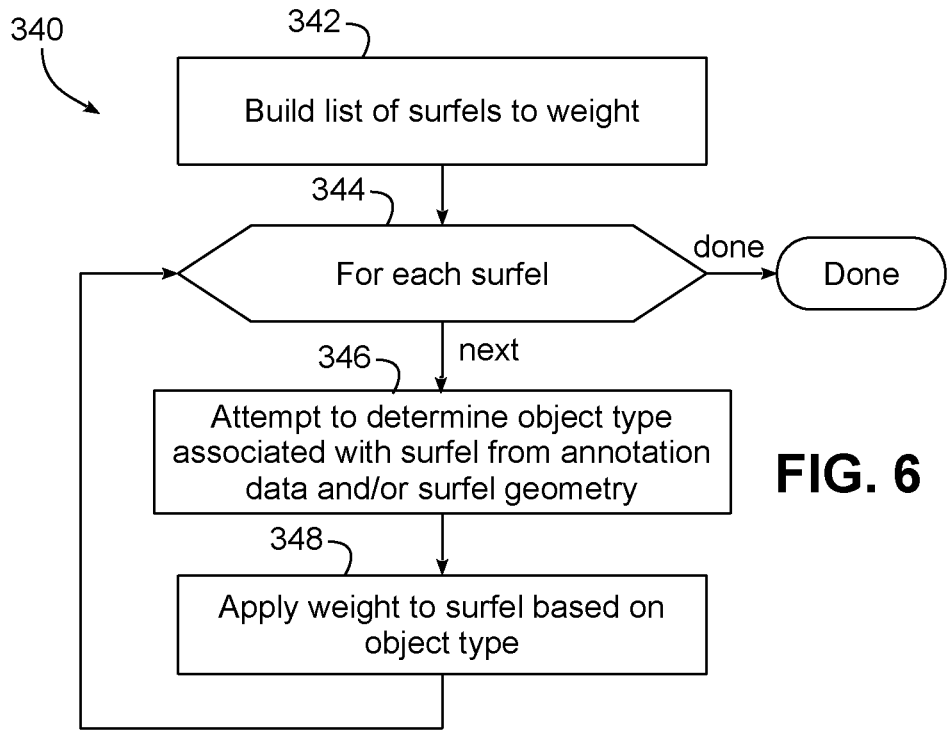
FIG. 6 is a flowchart illustrating an example sequence of operations for weighting surfels using a heuristic approach for use in the localization system of FIG. 3.

FIG. 6, for example, illustrates an example sequence of operations 340 for applying weights to surfels using annotations and/or geometric analysis, and capable of being performed, for example, by an autonomous vehicle or by an external data processing system, e.g., in remote vehicle service 170 of FIG. 1. Sequence 340 may be executed as a separate operation from generating surfels, and thus may be executed upon existing surfels, although it will be appreciated that in different implementations, surfels may be weighted when they are initially generated.

In block 342, a list of surfels to be weighted is built. For example, where it is desirable to weight surfels for a tile (or other region or area of an environment), a list of the surfels assigned to that tile is built, and a loop is initiated in block 344 to process those surfels. For each surfel, block 346 attempts to determine an object type associated with the surfel from annotation data, e.g., as stored in an atlas subsystem, and/or surfel geometry, and block 348 applies a weight to the surfel based upon the determined object type. Control then returns to block 344 to process other surfels in the list, and once all surfels are processed, the sequence is complete.

Figure 7:
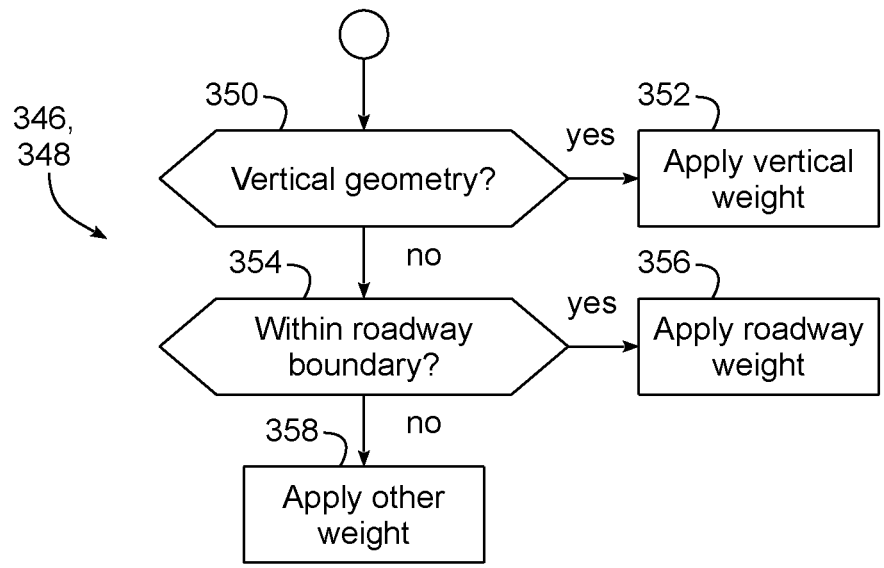
FIG. 7 is a flowchart illustrating an example implementation of blocks 346 and 348 of FIG. 6.

The manner in which annotations and/or geometric analysis may be used to weight surfels may vary in different implementations. FIG. 7, for example, illustrates one example implementation of blocks 346, 348 of sequence 340, which weights surfels based upon (a) whether they represent vertical geometry and/or (b) whether they are disposed within a roadway boundary. Block 350, for example, may determine whether a surfel is associated with vertical geometry, e.g., based upon analysis of the normal vector of the surfel, and in some instances, based upon the analysis of the normal vectors of all of the surfels in the same neighborhood around the surfel, and determining whether the vector(s) indicate a surface that is within X % from purely vertical. If the surfel is determined to represent vertical geometry, control passes to block 352 to apply a vertical weight, i.e., a weight associated with vertical geometry.

If not, control passes to block 354 to determine if the surfel is within a boundary of a roadway, e.g., whether the centroid of the surfel is located between annotations defining the boundaries of a roadway and at an elevation that is within a certain distance from the roadway surface. In some instances, the normal vector of the surfel and/or its surrounding surfels may also be analyzed to determine if the surfel represents horizontal geometry (e.g., a surface that is within X % from purely horizontal. If so, control passes to block 356 to apply a roadway weight, i.e., a weight associated with a roadway. If not, control passes to block 358 to apply another weight, e.g., to indicate that the surfel is less stable than surfels representing vertical geometry and/or roadways.

Figure 8:
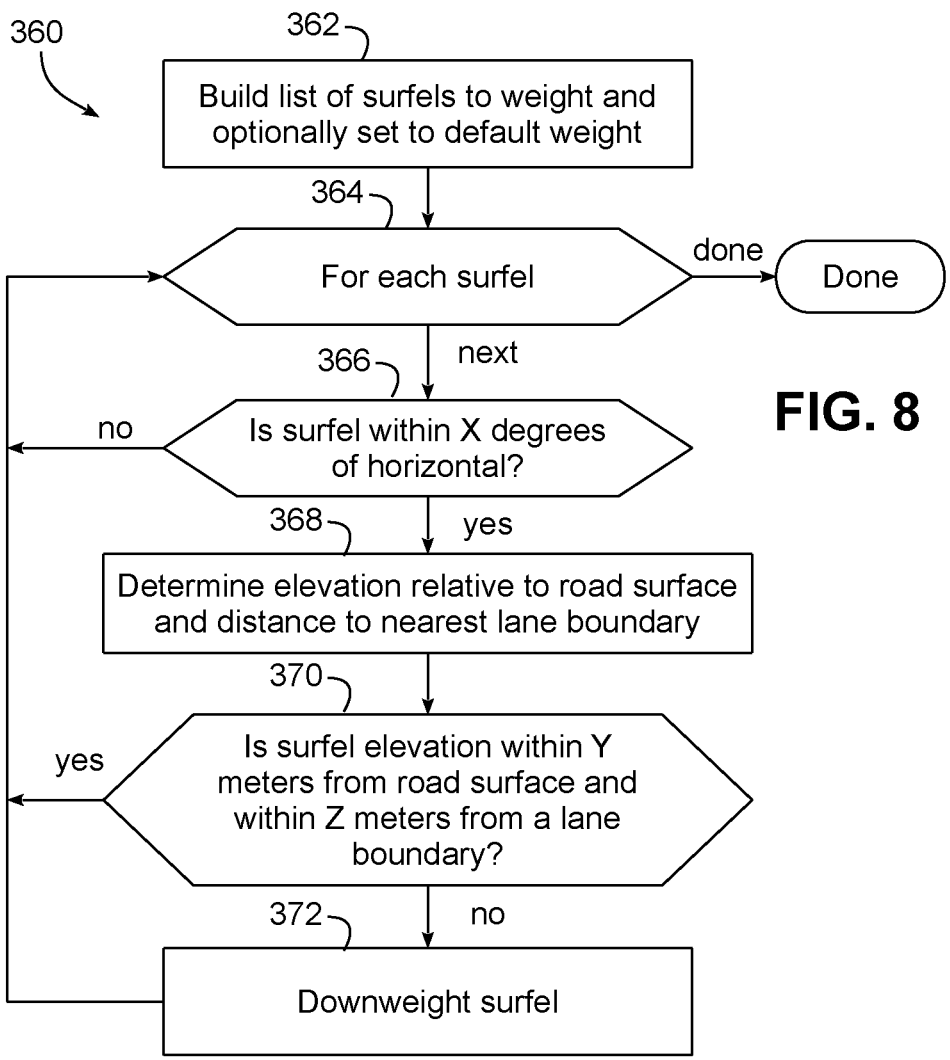
FIG. 8 is a flowchart illustrating another example sequence of operations for weighting surfels using a heuristic approach for use in the localization system of FIG. 3.

FIG. 8 illustrates a sequence of operations 360 representing another implementation for weighting surfels based upon annotations and/or geometric analysis. In this implementation, surfels are selectively downweighted to penalize surfels that are associated with horizontal geometry and are neither close to any lane boundary nor at a similar ground height. Thus, it will be appreciated that in some implementations, weights need not be assigned to each individual surfel on an individual basis, but instead surfels meeting certain conditions can be selectively upweighted or downweighted, in some instances from a default weight.

Thus, in block 362, a list of surfels is built, and in this implementation, each of the surfels is optionally set to a default weight, e.g., a relatively high weight that is then reduced for any surfels determined to meet the aforementioned conditions. Block 364 then initiates a loop to process each surfel in the list. For each surfel, block 366 determines whether the surfel is within X degrees (e.g., about 30 degrees) from horizontal, e.g., by analyzing the normal vector of the surfel and/or its surrounding surfels. If not, control returns to block 364 to process the next surfel in the list.

If so, block 366 passes control to block 368 to determine an elevation of the surfel relative to the road surface and a distance from the surfel to a nearest lane boundary, e.g., based upon one or more annotations. Block 370 then determines whether the surfel elevation is within Y meters (e.g., within about 0.4 m) from the road surface and within Z meters (e.g., within about 3 m) from the lane boundary. If not, block 370 passes control to block 372 to downweight the surfel, and control returns to block 364 to process the next surfel in the list. If so, however, block 372 is bypassed, and block 370 returns control to block 364. Once all surfels in the list have been processed, the sequence is complete.

Figure 9:
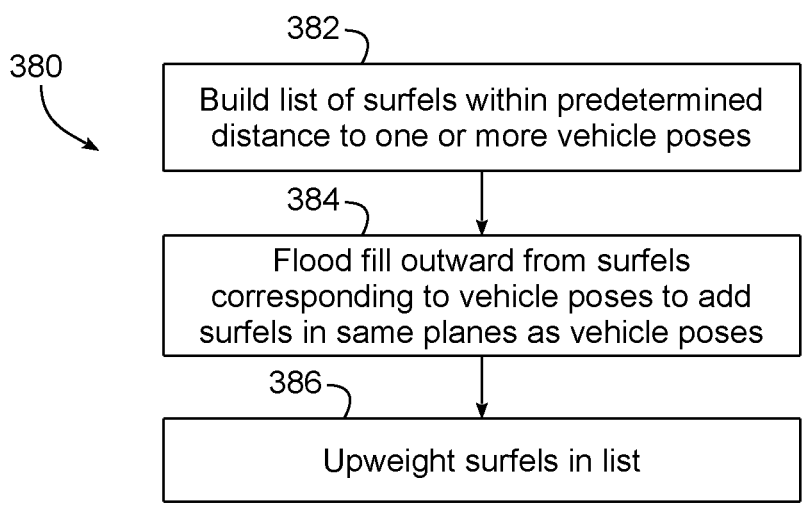
FIG. 9 is a flowchart illustrating another example sequence of operations for weighting surfels using a heuristic approach for use in the localization system of FIG. 3, and utilizing vehicle poses.

FIG. 9 next illustrates another sequence of operations 380 suitable for weighting surfels using a heuristic-based approach, in this instance based in part on prior vehicle poses. Specifically, it will be appreciated that reliance on annotations such as roadway or lane boundaries can introduce a reverse dependency in a mapping process in some instances, and furthermore, may not account for areas that are potentially not mapped, e.g., side roads. Therefore, in some implementations, it may be desirable to rely at least in part on prior vehicle poses to infer that the surfaces proximate to where vehicles have previously been positioned are associated with roadways, and thus potentially stable surfaces that can be assigned relatively high weights to indicate the relative stability of such surfaces. The vehicle poses may be determined, for example, from vehicle logs collected from autonomous and/or non-autonomous vehicles traveling through the environment, and in some instances stored as map data in an atlas subsystem.

In addition, while in some implementations vehicle poses may be used solely to weight surfels, it may also be desirable to further analyze the surfaces surrounding the vehicle poses to additionally capture additional surfaces that are adjacent to the poses but also represent portions of a roadway. Specifically, it may be assumed in some instances that roadways have generally planar surfaces, so by expanding outwardly from vehicle poses along any detected planar surfaces, it may be assumed that the planar surfaces are also part of the same roadway and are potentially relatively stable from the perspective of localization. Doing so, for example, may upweight shoulders or other portions of a roadway that may not be driven on regularly, but are nonetheless flat, planar surfaces that should be relatively stable.

Thus, sequence 380 may begin in block 382 by building a list of surfels within a predetermined distance from one or more vehicle poses. Block 384 then performs a flood fill operation to expand outwardly from the surfels in the list to add any surfels determined to be within the same planes as those associated with the vehicle poses. For example, in one implementation a flood fill operation may determine a plane associated surfel added to the list based upon a vehicle pose and then add any surfels that are within a predetermined elevation from the plane and oriented within a predetermined range of angles of the plane. Block 386 then upweights the surfels in the list to indicate their relative stability, as they are determined to essentially be associated with the surface of a roadway.

It will be appreciated that other manners of expanding outwardly from the vehicle poses to capture other surfels representing the same general structure of the roadway may be used, and in some implementations, no expansion may be used, and only vehicle poses may be used for upweighting surfels. It will also be appreciated from sequence 380 that rather than processing individual surfels and applying weights to surfels on an individual basis, surfels may be added to or removed from lists and assigned collective weights in some implementations.

Figure 10:
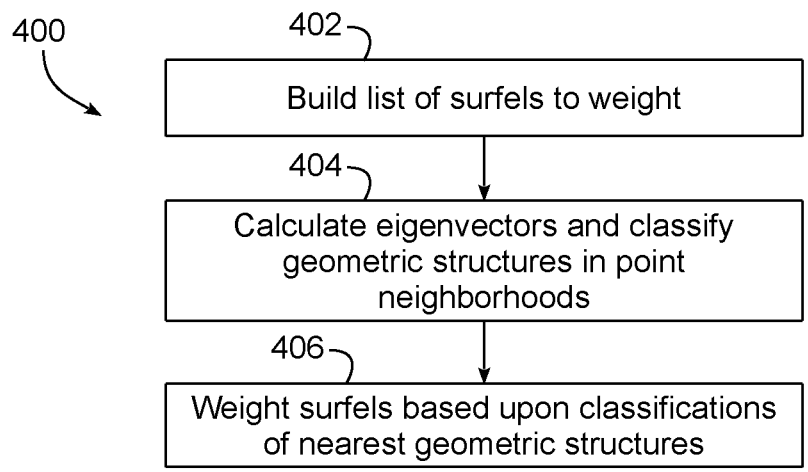
FIG. 10 is a flowchart illustrating another example sequence of operations for weighting surfels using a heuristic approach for use in the localization system of FIG. 3, and utilizing eigenvector analysis.
Figure 11:
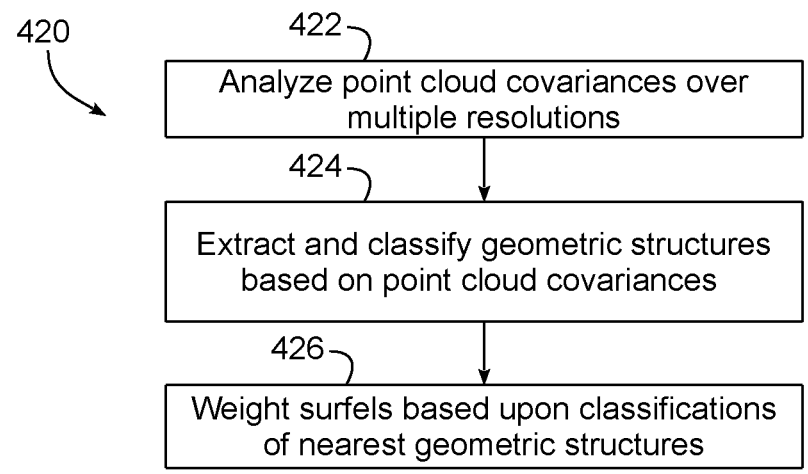
FIG. 11 is a flowchart illustrating another example sequence of operations for weighting surfels using a heuristic approach for use in the localization system of FIG. 3, and utilizing point cloud covariances.
Figure 12:
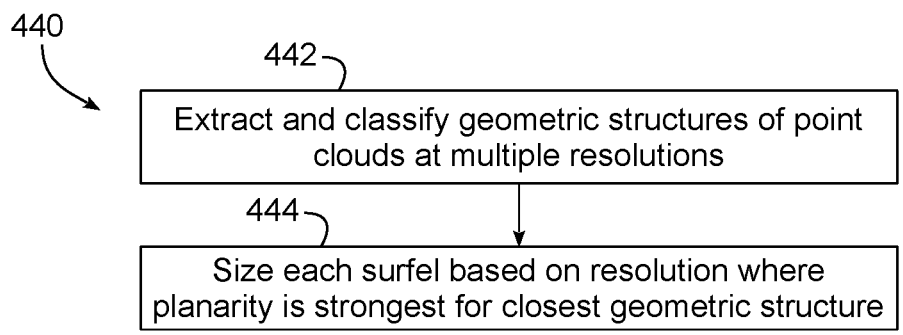
FIG. 12 is a flowchart illustrating an example sequence of operations for sizing surfels for use in the localization system of FIG. 3.

FIGS. 10-12 next illustrate a number of additional variations that are based at least in part on geometric analysis associated with surfels and their surroundings, but that are not necessarily based upon attempting to identify or classify the objects represented by such surfels. In some implementations, for example, the geometric structures in the vicinities of surfels may be analyzed and classified from a geometric standpoint in order to weight surfels. In some instances, for example, eigenvectors in a point cloud neighborhood (e.g., as may be generated from vehicle logs, and in some instances, stored as map data in an atlas subsystem) may be analyzed to classify the geometric structures within which surfels are associated.

In some implementations, for example, "fuzziness" may be analyzed for a particular point cloud neighborhood by calculating a ratio between the smallest to the largest eigenvector in the point cloud neighborhood. In other implementations, planarity may be determined for a point cloud neighborhood, again using eigenvectors.

In one implementation, for example, the standard deviation of the eigenvectors ($\sigma_i = \sqrt{\lambda_i}$) may be used to classify the geometric structure of a point cloud neighborhood as primarily linear, primarily planar, or primarily volumetric as follows:

linear: $(\sigma_2 - \sigma_1)/\sigma_2$
planar: $(\sigma_1 - \sigma_0)/\sigma_2$
volumetric: $\sigma_0/\sigma_2$ where the 0-th eigenvector is the smallest. By normalizing these features, they may be characterized as being primarily linear, planar or volumetric. Features that are linear may correspond to posts, tree trunks, and edges of other structures, while features that are planar may correspond to buildings, roadways, walls, etc. Features that are volumetric may correspond more generally to more unstable geometric structures such as vegetation, similar in many respects to fuzziness. In addition, planarity in some instances may be somewhat sensitive to the quality of aligned point clouds (at mapping time) as well as the local point cloud density, so a mild and robust underweighting may be suitable in such instances. In addition, in some instances, volumetric and planarity measures may differ from one another with regard to the sensitivity to edges, as planarity has been found to decrease around edges, which can weight vegetation lower than under a volumetric measure.

FIG. 10, for example, illustrates a sequence of operations 400 for weighting surfels based upon classifying geometric structures represented by surfels using eigenvectors as described above. In block 402, a list of surfels to weight is built, and in block 404, eigenvectors are calculated for the point neighborhoods of such surfels and the geometric structures therein are classified based upon the eigenvectors, e.g., using any of the fuzziness, linearity, planarity, or volumetric approaches discussed above. Surfels are then weighted in block 406 based upon these classifications.

As another approach, it has been found that a property of strong planar areas is that they generally appear to be planar at multiple scales, so it may also be desirable in some implementations to analyze point cloud covariances over multiple resolutions (e.g., various radiuses of neighborhood sphere) and extract features based upon these covariances. Then, from the extracted features, surfels may be adaptively weighted by categorizing them or by transforming features into weights. FIG. 11, for example, illustrates a sequence of operations 420 for weighting surfels based upon point cloud covariances. In block 422, a list of surfels to weight is built, and in block 424, geometric structures are extracted and classified based upon point cloud covariances at multiple resolutions. Surfels are then weighted in block 426 based upon these classifications.

Next, as illustrated in FIG. 12, in some implementations, surfel sizing may be optimized in addition to, or in lieu of, applying weights as described above, based on point cloud covariances. Specifically, FIG. 12 illustrates a sequence of operations 440 for sizing surfels, and begins in block 442 by extracting and classifying geometric structures of point clouds at multiple resolutions. Block 444 then sizes each surfel based on the resolution where planarity is strongest for its closest geometric structure. One manner of implementing blocks 442 and 44 may be to calculate a measure of unpredictability using the Shannon entropy of the discrete probability distribution of the modes (linear, planar, and volumetric) at each of the scales. It will be appreciated that the lower the entropy is, the more a particular mode dominates the others, so the minimum entropy across all the scales may be considered to be the "optimal" scale, and thus the scale to use in order to size each surfel.

Other heuristic approaches, which may be based on annotations and/or geometric analysis of map data, may also be used in other implementations. Therefore, the invention is not limited to the specific heuristic implementations discussed herein.

Alignment Statistic Weighting

Another approach that may be utilized for weighting surfels and other geometric elements is based upon alignment statistics. In particular, it will be appreciated that the results of prior alignment operations within a geographical region may be useful indicators of the relative stabilities of different surfels or geometric elements representing that geographical region. If, for example, a best fit alignment obtained at a particular location is driven by close alignment between sensor returns and some of the surfels in a surfel map, yet other surfels are found to be less aligned with the sensor returns, an inference may exist that the former surfels are more stable than the latter. Moreover, if such an inference is reinforced over multiple alignment operations and/or by alignment operations performed by multiple autonomous vehicles traveling within the geographical region, it may be desirable to adaptively weight different surfels to reflect these relative stabilities. It will be appreciated that the calculations performed in alignment operations, e.g., the errors and/or distances between associated points and surfels, as well as the identification of outliers, may be useful for the purposes of determining surfel stability, so in some implementations, it may be desirable to store these intermediate calculations as statistics, or otherwise calculate and store statistics indicative of stability from these intermediate calculations, in connection with performing alignment operations, such that the statistics may be used to adaptively weight surfels and potentially improve future alignment operations.

Alignment statistics used in some implementations may include statistics such as alignment quality, outlier percentage, overlap percentage, etc. Alignment quality, for example, refers to a per-correspondence measure of quality for each surfel, and may additionally be used in some alignment operations for performing alignment exemptions to determine whether a particular correspondence should be excluded as an outlier. Outlier percentage refers to a percentage of correspondences classified as outliers, while overlap percentage refers to the percentage of points from the vehicle that have a correspondence with the map. The implementations discussed hereinafter focus on the use of alignment quality, although it will be appreciated that additional statistics capable of being collected from an alignment operation may be used instead of or in combination with alignment quality, so the invention is not limited to the use of alignment quality as the sole alignment statistic that may be used for the adaptive weighting approaches discussed herein.

It will also be appreciated that in some instances, the quality of initial alignment operations absent any weighting may hinder the ability of an adaptive weighting approach to quickly reach an optimal solution. As such, it may be desirable in some in adaptive weighting approaches based on alignment statistics to initialize surfel weights using a different approach (e.g., any of the heuristic approaches discussed above), and then adapt those initial weights based upon the outcomes of subsequent alignment operations.

Figure 13:
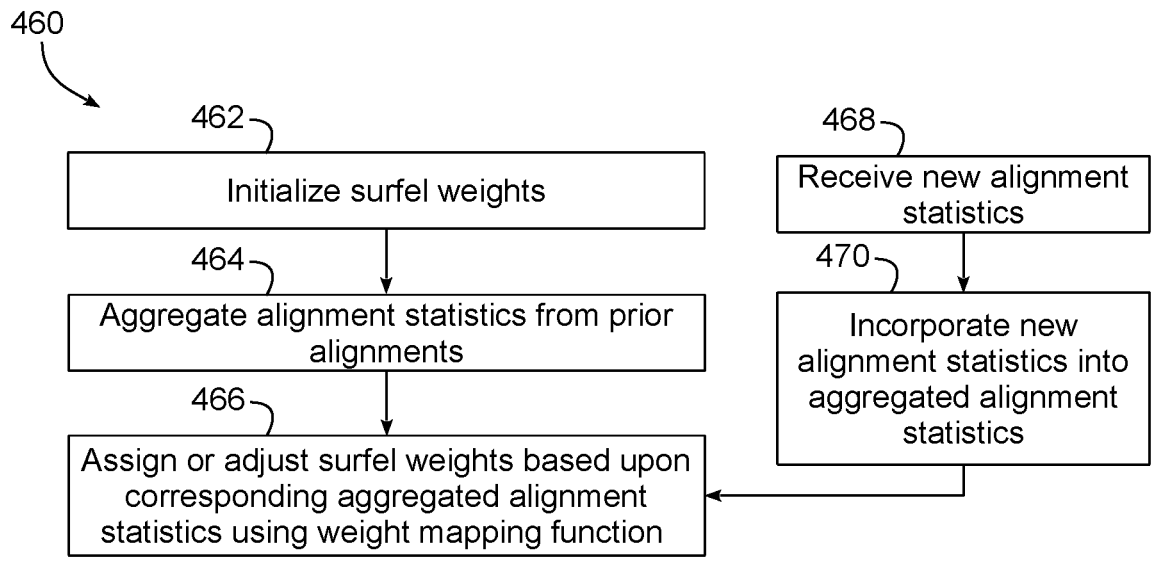
FIG. 13 is a flowchart illustrating an example sequence of operations for weighting surfels using alignment statistics for use in the localization system of FIG. 3.
Figure 14:
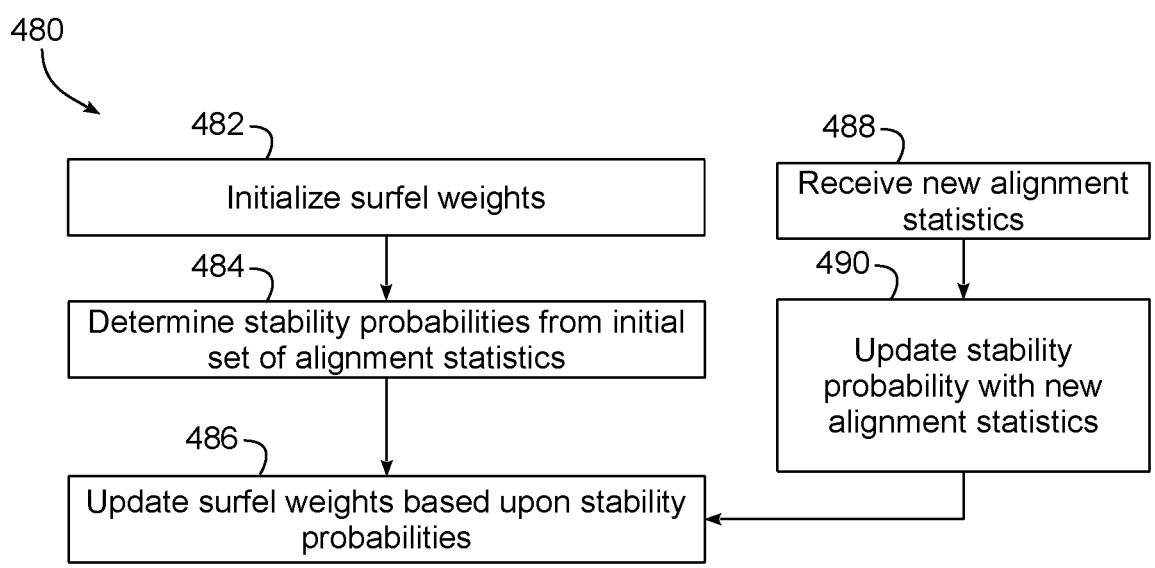
FIG. 14 is a flowchart illustrating another example sequence of operations for weighting surfels using alignment statistics for use in the localization system of FIG. 3, and utilizing a Bayesian filter.

FIGS. 13 and 14 illustrate two example implementations of an alignment statistic weighting approach. FIG. 13, in particular, illustrates a sequence of operations 460 that applies a function that maps alignment quality statistics to surfel weights. In some implementations, for example, a low alignment quality may be mapped to a low surfel weight (e.g., 0.1 on a scale of 0 to 1) and a high alignment quality may be mapped to a high surfel weight (e.g., 1.0 on a scale of 0 to 1), with an interpolation performed for alignment qualities between these two limits. In some instances, for example a smoothstep function with a minimum cutoff may be used. As illustrated in FIG. 13, sequence 460 may begin in block 462 by initializing surfel weights, either to a default value, or optionally, based upon one of the heuristic approaches discussed above. Then, in block 464, alignment statistics from past alignment operations may be aggregated, e.g., to generate an average alignment quality for each correspondence between a point and a surfel. Block 466 may then assign or adjust surfel weights using the aggregated alignment statistics and the selected mapping function. In some implementations, for example, a new weight may be assigned to a surfel based upon a function, while in other implementations, the output of the function may be combined with the prior weight assigned to the surfel to adjust the weight, thereby allowing the weight to increase or decrease according to the alignment quality of one or more prior alignment operations.

As shown in blocks 468 and 470, for example, as new alignment statistics are received (block 468), the new alignment statistics may be incorporated into the aggregated alignment statistics (block 470) and then an adjustment may be made (block 466) to the surfel weights in order to incorporate the newly-received alignments statistics. By doing so, weights may be adaptively adjusted over time as additional vehicles make additional trips through the geographical region and alignment operations are performed during such trips.

FIG. 14 illustrates a sequence of operations 480 that implements an alternative approach to that of FIG. 13, and that is based on a Bayesian update approach. With such an approach, each incoming sensor return may be treated as an observation on the stability of each surfel, and a Bayesian approach may be used to update the weights. Such an update may use the alignment statistics to update a stability probability, using a log odds form to simplify the computation, e.g., as follows:

$$l(s) := \log \frac{p(s)}{1 - p(s)}$$
$$l^{i+1} = l^i + l(\text{model}(w_i)) - l(p_{prior})$$
$$\text{model}(w) = e^{\frac{-(1-w)^2}{\sigma_w^2}} p_{stable}$$

where I( ) is the log odds computation, and model is the measurement model. An advantage of using a log odds form is that a number of the quantities cancel out, leaving a relatively small number of relatively intuitive quantities. The parameters that generally are established are the standard deviation for a stable alignment weight, and the priors, and in one example implementation, the following may be used: $\sigma_w$=0.2, $p_{stable}$=0.6, and $p_{prior}$=0.5, although it will be appreciated that other initial parameters may be used in other implementations.

To convert from log odds to probability, the sigmoid may be used:

$$s(x) = \frac{1}{1+e^{-x}}$$

In such a framework, the surfel weight represents the probability that a surfel is stable. In other implementations, other factors may also be considered, e.g., distance to the autonomous vehicle), or alternatively another function that maps from stability probability to surfel weight may be used (e.g., a function that discretizes to a small number of discrete surfel weights). Such an approach is also readily adapted for updating surfel weights as new observations arrive.

Thus, for sequence 480 of FIG. 14, block 482 may initialize surfel weights, either to a default value, or optionally, based upon one of the heuristic approaches discussed above. Then, in block 484, stability probabilities are determined from an initial set of alignment statistics, e.g., using the aforementioned Bayesian update approach. Then, if a mapping function is used, block 486 may update surfel weights based upon the stability probabilities, resulting in a set of surfel weights that are usable for alignment operations. Then, as represented in blocks 488 and 490, as new alignment statistics are received (block 488), the new alignment statistics may be used to update the stability probability for each surfel (block 490), and the weight adjusted accordingly (block 486). By doing so, weights again may be adaptively adjusted over time as additional vehicles make additional trips through the geographical region and alignment operations are performed during such trips.

Other alignment statistics, and other manners of mapping alignment statistics to weights, may be used in other implementations, so the invention is not limited to the specific examples discussed herein.

Machine Learning Weighting

Figure 15:
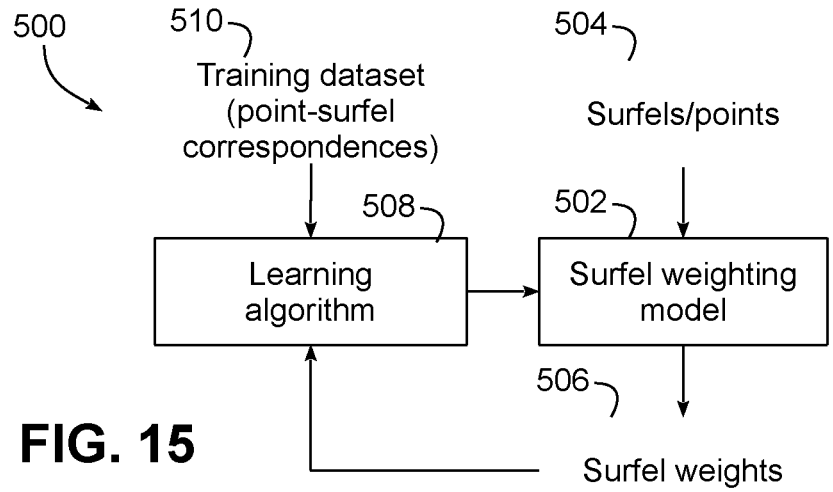
FIG. 15 is a block diagram illustrating an example machine learning implementation of a surfel weighting system for use with the localization system of FIG. 3.

It will also be appreciated that the aforementioned weighting approaches may also be implemented using machine learning to derive surfel weights from various types of data. FIG. 15, for example, illustrates a machine learning-based surfel weighting system 500 that includes a surfel weighting model 502 capable of receiving as input surfels and/or sensor returns such as point clouds 504 and outputting appropriate surfel weights 506. Surfel weighting model 502 may be trained by any of a number of learning algorithms 508 based upon a training set 510, e.g., a training set of point-surfel (or point-geometric element) correspondences based on repeated log passes over an environment or geographical region. Surfels that were determined to be unstable over time would thus be downweighted in the training dataset, and used to create a model that can be applied to any set of surfels (or points).

Figure 16:
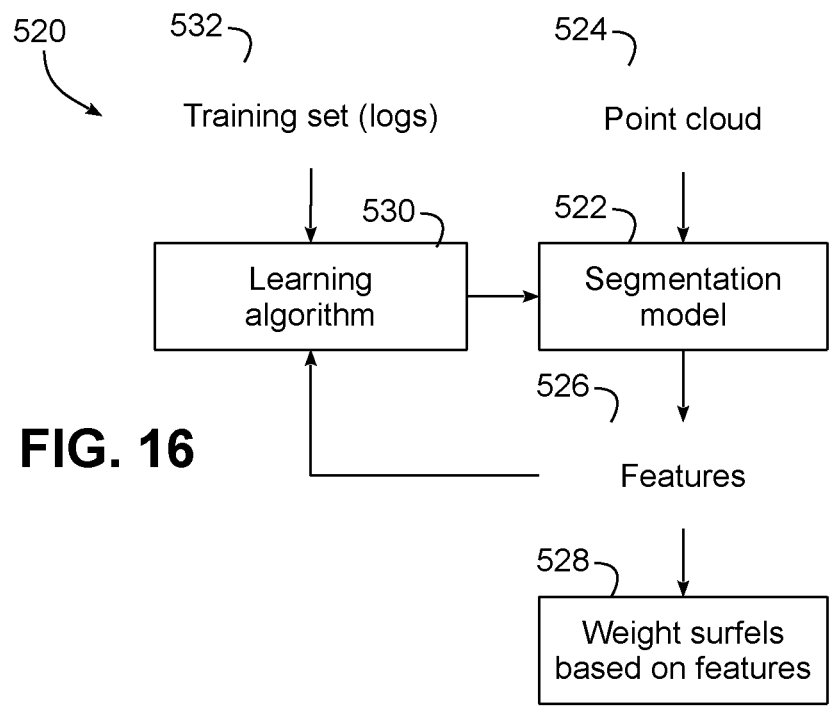
FIG. 16 is a block diagram illustrating another example machine learning implementation of a surfel weighting system for use with the localization system of FIG. 3.

As another example, and as illustrated in FIG. 16, rather than utilizing a model that maps surfels (or points) to weights, a machine-learning surfel weighting system 520 may instead utilize machine learning to identify features in an environment, and then use either a separate machine learning model or a function to map identified features to different weights. For example, surfel weighting system 520 may utilize a segmentation model 522 that receives point clouds 524 representing sensor returns from LIDAR sensors on vehicles that travel through a geographical region and outputs features 526, e.g., various types of objects such as roads, buildings, posts, signs, walls, etc. Then, using either a machine learning model or a function, the features 526 may be mapped to surfels (illustrated in block 528). Training of segmentation model 522 may be performed by any number of suitable learning algorithms 530 based upon a training set 532, e.g., logs of sensor returns from LIDAR sensors on vehicles that travel through the geographical region.

Thus, it will be appreciated that in different implementations, various types of input data, including map data, alignment statistics, point cloud data, etc., may be used to train machine learning models and/or may be used as inputs to machine learning models. In addition, the models may be used to output surfel weights in some instances, and in other instances, to output other data, e.g., features, objects, geometric structures or characteristics, etc., from which a mapping may be performed to derive surfel weights therefrom.

CONCLUSION

It will be appreciated that by weighting surfels in the various manners described herein, the accuracy of alignment operations is generally improved, and in many instances, the number of outliers detected during alignment may be reduced, and the frequency of alignment operation failures may be reduced. In addition, as alignment operation failures in many cases are addressed by remapping the areas where alignment operation failures occur, and thus require additional computational and/or organizational resources, weighting surfels can, in some instances, increase the lifetimes of surfel maps, and reduce the need for remapping areas represented by those surfel maps. Such approaches may be particularly useful in rural environments where the number of man-made structures available for use in localization is reduced, and in particular, where vegetation and other relatively unstable surfaces are present in the environments.

Other variations will be apparent to those of ordinary skill. Therefore, the invention lies in the claims hereinafter appended.

What is claimed is:

1. A computer-implemented method for generating a weighted map used for autonomous vehicle localization, comprising:
   accessing stored map data describing the environment, wherein the map data includes a plurality of map data units that describe a plurality of geometric elements for a plurality of objects in the environment;
   generating a weight associated with a respective map data unit of the plurality of map data units, wherein the weight is indicative of a relative stability of a respective geometric element that is described by the respective map data unit, wherein generating the weight includes performing geometric analysis of an orientation and/or position of the respective geometric element described by the respective map data unit in the environment; and
   storing and communicating the generated weight to an autonomous vehicle control system of an autonomous vehicle to cause the autonomous vehicle control system to use the generated weight to weight a contribution of the respective map data unit in an alignment operation that determines a pose for the autonomous vehicle by aligning a plurality of sensor returns obtained from one or more sensors of the autonomous vehicle with the plurality of map data units and to control a trajectory of the autonomous vehicle using the determined pose.

2. The method of claim 1, wherein generating the weight includes generating the weight based at least in part on a verticality determined for the respective map data unit and/or the geometric element described by the respective map data unit.

3. The method of claim 1, wherein generating the weight includes generating the weight based at least in part upon a distance determined between the respective map data unit and a road surface in the environment.

4. The method of claim 1, wherein generating the weight includes generating the weight based at least in part upon whether the position of the respective map data unit is determined to be within a road boundary in the environment.

5. The method of claim 1, wherein generating the weight includes generating the weight based at least in part upon a proximity of the respective map data unit to a vehicle pose associated with the environment.

6. The method of claim 1, wherein the weight is a first weight, the respective map data unit is a first map data unit, and the geometric element is a first geometric element, the method further comprising generating a second weight for a second map data unit by performing geometric surface analysis of the second geometric element described by the second map data unit and/or of surrounding geometry in the environment.

7. The method of claim 6, wherein the geometric surface analysis determines a fuzziness of the second geometric element described by the second map data unit and/or of the surrounding geometry.

8. The method of claim 6, wherein the geometric surface analysis determines a planarity of the second geometric element described by the second map data unit and/or of the surrounding geometry.

9. The method of claim 1, wherein the weight is a first weight, the respective map data unit is a first map data unit, and the geometric element is a first geometric element, the method further comprising generating a second weight for a second map data unit by performing geometric analysis of point cloud covariances over multiple resolutions.

10. The method of claim 9, further comprising determining a size of a second the geometric element described by the second map data unit based upon geometric analysis of point clouds over multiple resolutions.

11. The method of claim 1, wherein the weight is a first weight, the respective map data unit is a first map data unit, and the geometric element is a first geometric element, the method further comprising generating a second weight for a second map data unit based at least in part upon an alignment statistic generated during a prior alignment operation.

12. The method of claim 1, wherein the weight is a first weight, the respective map data unit is a first map data unit, and the geometric element is a first geometric element, the method further comprising generating a second weight for a second map data unit based at least in part upon applying a Bayesian filter to an alignment statistic generated during a prior alignment operation.

13. The method of claim 1, wherein the weight is a first weight, the respective map data unit is a first map data unit, and the geometric element is a first geometric element, the method further comprising generating a second weight for a second map data unit using a machine learning model.

14. The method of claim 13, wherein the machine learning model is configured to output weights, and wherein generating the second weight using the machine learning model includes training the machine learning model using a training set of point-geometric element correspondences.

15. The method of claim 13, wherein the machine learning model is configured to output features, and wherein generating the second weight using the machine learning model includes training the machine learning model using a training set of logs.

16. The method of claim 1, wherein the geometric element described by the respective map data unit is a surfel.

17. An apparatus, comprising:
a memory storing map data describing an environment, wherein the map data includes a plurality of map data units that describe a plurality of geometric elements for a plurality of objects in the environment;
one or more processors coupled to the memory; and
computer instructions executable by the one or more processors to:
generate a weight associated with a respective map data unit of the plurality of map data units in the memory, wherein the weight is indicative of a relative stability of a respective geometric element that is described by the respective map data unit, wherein generating the weight includes performing geometric surface analysis of the geometric element described by the respective map data unit and/or of surrounding geometry in the environment; and
store and communicate the generated weight to an autonomous vehicle control system of an autonomous vehicle to cause the autonomous vehicle control system to use the generated weight to weight a contribution of the respective map data unit in an alignment operation that determines a pose for the autonomous vehicle by aligning a plurality of sensor returns obtained from one or more sensors of the autonomous vehicle with the plurality of map data units and to control a trajectory of the autonomous vehicle using the determined pose.

18. A non-transitory computer readable storage medium storing computer instructions executable by one or more processors to perform a method of generating a weighted map used for autonomous vehicle localization, the method comprising:
accessing stored map data describing the environment, wherein the map data includes a plurality of map data units that describe a plurality of geometric elements for a plurality of objects in the environment;
generating a weight associated with a respective map data unit of the plurality of map data units, wherein the weight is indicative of a relative stability of a respective geometric element that is described by the respective map data unit, wherein generating the weight includes performing geometric analysis of point cloud covariances over multiple resolutions; and
storing and communicating the generated weight to an autonomous vehicle control system of an autonomous vehicle to cause the autonomous vehicle control system to use the generated weight to weight a contribution of the respective map data unit in an alignment operation that determines a pose for the autonomous vehicle by aligning a plurality of sensor returns obtained from one or more sensors of the autonomous vehicle with the plurality of map data units and to control a trajectory of the autonomous vehicle using the determined pose.

* * * * *